US012579549B2

(12) United States Patent
Berrington et al.

(10) Patent No.: US 12,579,549 B2
(45) Date of Patent: Mar. 17, 2026

(54) PLATFORM FOR FACILITATING AN AUTOMATED IT AUDIT

(71) Applicant: BIDVEST ADVISORY SERVICES (PTY) LTD, Johannesburg (CA)

(72) Inventors: Lauren Catherine Berrington, Craighall Park (CA); Karl Gustav Silvo, Krugersdorp (CA); Frans Johannes Geldenhuys, Midrand (CA); Craig Lindsay, Lonehill (CA); Louise Ingrid Chunnett, Sandton (CA)

(73) Assignee: BIDVEST ADVISORY SERVICES (PTY) LTD, Johannesburg (ZA)

( * ) Notice: Subject to any disclaimer, the term of this patent is extended or adjusted under 35 U.S.C. 154(b) by 377 days.

(21) Appl. No.: 17/367,949

(22) Filed: Jul. 6, 2021

(65) Prior Publication Data

US 2021/0334821 A1     Oct. 28, 2021

Related U.S. Application Data

(63) Continuation of application No. 16/527,515, filed on Jul. 31, 2019, now abandoned.

(51) Int. Cl.
*G06Q 30/018*     (2023.01)
*G06F 3/04847*     (2022.01)
(Continued)

(52) U.S. Cl.
CPC ....... *G06Q 30/018* (2013.01); *G06F 3/04847* (2013.01); *G06F 9/54* (2013.01);
(Continued)

(58) Field of Classification Search
USPC ............................................... 705/7.11–7.42
See application file for complete search history.

(56) References Cited

U.S. PATENT DOCUMENTS 6,836,750 B2     12/2004   Wong et al.
6,915,234 B2 *    7/2005   Curtin .................... G06Q 30/02
                                                                   702/182

(Continued)

OTHER PUBLICATIONS

Lauren Catherine Berrington et al., Invention Presentation Slides, Apr. 11, 2018; 16 pages.

*Primary Examiner* — Richard N Scheunemann
(74) *Attorney, Agent, or Firm* — Maier & Maier, PLLC

(57)     ABSTRACT

A platform for facilitating an automated IT audit. The platform may have a frontend allowing users to access the platform, a backend configured to perform processing, and a data collection system equipped to interface with connectors. The backend may include at least one server equipped to send, receive, store, and process data; a testing and analyzing system that may make use of algorithms, machine learning, and artificial intelligence in order to test and analyze the collected data against pre-configured best practice standards and policies, and a reporting system that may be configured to transmit the tested and analyzed data to the frontend. The backend system may be configured to opine on the data and generate specific recommendations about future developments of an auditee's IT infrastructure, allowing an audit to be completed automatically from start to finish by the use of the software, eliminating the need for human intervention.

20 Claims, 12 Drawing Sheets

(51) Int. Cl.

| | |
|---|---|
| *G06F 9/54* | (2006.01) |
| *G06N 5/04* | (2023.01) |
| *H04L 9/40* | (2022.01) |
| *G06F 3/0482* | (2013.01) |
| *G06N 20/00* | (2019.01) |

(52) U.S. Cl.
CPC ............. *G06N 5/04* (2013.01); *H04L 63/083* (2013.01); *H04L 63/105* (2013.01); *G06F 3/0482* (2013.01); *G06N 20/00* (2019.01); *H04L 2463/082* (2013.01)

(56) References Cited

U.S. PATENT DOCUMENTS

| | | | |
|---|---|---|---|
| 7,065,496 B2 * | 6/2006 | Subbloie | G06Q 30/0206 705/7.29 |
| 8,543,916 B2 | 9/2013 | Anderson et al. | |
| 9,973,524 B2 | 5/2018 | Boyer et al. | |
| 10,104,110 B2 | 10/2018 | Oliphant et al. | |
| 2003/0220940 A1 | 11/2003 | Futoransky et al. | |
| 2007/0162400 A1 * | 7/2007 | Brew | G06F 21/6236 705/59 |
| 2008/0270198 A1 * | 10/2008 | Graves | G06Q 10/06 705/7.12 |
| 2012/0147894 A1 * | 6/2012 | Mulligan | H04L 41/40 718/1 |
| 2013/0173643 A1 * | 7/2013 | Ezzat | G06Q 30/02 707/756 |
| 2013/0198050 A1 * | 8/2013 | Shroff | H04L 43/04 709/224 |
| 2014/0344891 A1 * | 11/2014 | Mullick | H04L 63/105 726/1 |
| 2015/0019301 A1 * | 1/2015 | Jung | G06Q 10/06393 705/7.39 |
| 2015/0200927 A1 * | 7/2015 | Williams | H04L 63/0869 726/7 |
| 2016/0308819 A1 * | 10/2016 | Gupta | H04L 61/4511 |
| 2017/0214711 A1 * | 7/2017 | Arnell | H04L 43/062 |
| 2017/0223024 A1 * | 8/2017 | Desai | H04L 63/20 |
| 2019/0182289 A1 * | 6/2019 | White | G06F 21/6245 |

* cited by examiner

300

Technological Innovation and Objective: Product Comparisons

| Product Categories | 312 Existing Products (with human effort and intervention) | 314 ALICE (without human effort and intervention) |
|---|---|---|
| 302 Business Intelligent (BI) Tool | Avails data for analysis | Will also opine on availed data |
| 304 Workflow Management Tool | Facilitates the work flow of audit evidence | Will also perform the audit evaluation on the audit evidence using cognitive automation and robotic processing |
| 306 Document Repository | Facilitates the storage of the audit evidence collected | Will also perform the audit evaluation on the stored audit evidence collected |
| 308 Audit Tool | Performs limited audit evaluations per specific systems | Performs a fully integrated (cradle-to-grave) and automated IT audit function across the IT environment |
| 310 IT Monitoring Tool | Specific tools specific to individual systems | Will not displace or replace existing investments into tools, but rather robustly interrogate the output of the tools against audit evidence and collate and aggregate comparisons providing a single view of the IT environment through an audit lens |

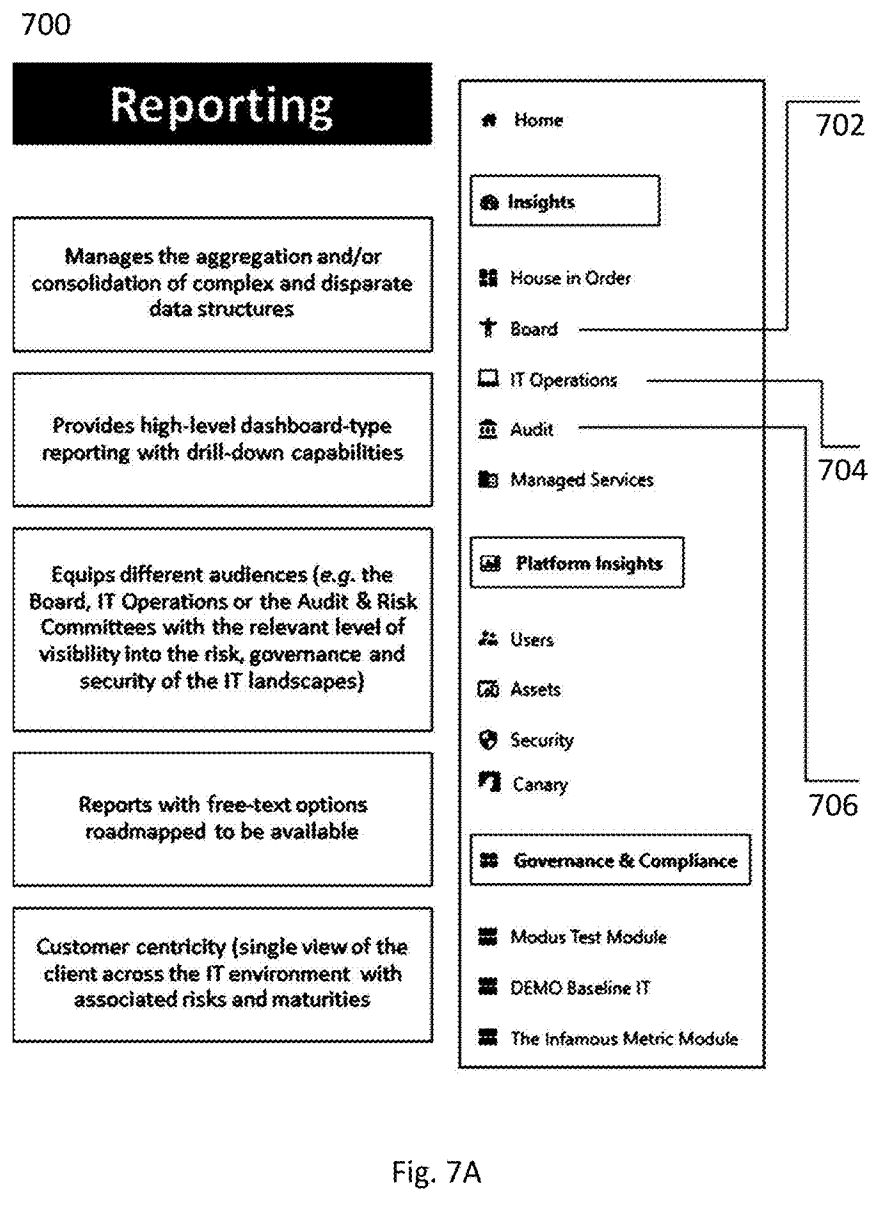

Reporting

Manages the aggregation and/or consolidation of complex and disparate data structures Provides high-level dashboard-type reporting with drill-down capabilities Equips different audiences (e.g. the Board, IT Operations or the Audit & Risk Committees with the relevant level of visibility into the risk, governance and security of the IT landscapes)

Reports with free-text options roadmapped to be available

Customer centricity (single view of the client across the IT environment with associated risks and maturities

702

* Home
@ Insights
⊞ House in Order
✝ Board

704

☐ IT Operations
⊞ Audit
▦ Managed Services

⊞ Platform Insights

⚎ Users
▨ Assets
◈ Security
⌐ Canary

706

⊞ Governance & Compliance

⊞ Modus Test Module
⊞ DEMO Baseline IT
⊞ The Infamous Metric Module

Fig. 7A

Identify security issue with testing and analysis system
1002

Determine size of IT environment, risk appetite, and risk profile
1004

Determine remediation budget
1006

Estimate prices and efficacy of remediation options
1008

Optimize remediation options based on cost and estimated effect
1010

Generate and output recommendations for user
1012

1000

PLATFORM FOR FACILITATING AN AUTOMATED IT AUDIT

CROSS-REFERENCE TO RELATED APPLICATIONS

The present patent application claims benefit and priority to U.S. patent application Ser. No. 16/527,515 filed on Jul. 31, 2019, which is hereby incorporated by reference into the present disclosure.

COPYRIGHT NOTICE

BACKGROUND

Information technology (IT) audits, sometimes also called information systems (IS) audits, are processes by which an organization's information technology infrastructure, policies, and operations are examined and evaluated. Such audits specifically examine the management controls within an information technology infrastructure, in order to determine if the information systems are meeting all necessary objectives for an information technology system, such as safeguarding assets, maintaining data integrity, and operating effectively to achieve the organization's goals or objectives. (In many cases, such audits may be performed in conjunction with audits of other systems, such as a financial audit or internal audit.)

Audit procedures, in general, are designed to ensure that a business or other organization complies with certain quality standards. This can help ensure that problems with the existing procedures of the business or the other organization are found and can be corrected. Ensuring that the business complies with such procedures can also ensure that the business is protected from legal trouble, in cases where the standards in question are laws or administrative guidelines. Finally, it can also ensure that the business is easy to expand (or is easy to incorporate into another business if purchased), since the business's existing procedures are likely to be somewhat similar to those of other businesses and somewhat familiar to many of the new hires. This can help to attract investment.

However, strict adherence to a single comprehensive standard is often wasteful and not useful for all organizations that might be subject to the audit. Imposing strict uniform compliance requirements can likewise cause the organization to seek to meet the letter of the requirements rather than its spirit, defeating much of the purpose of the standard and impairing efficiency. As such, it may in some cases be preferable to measure a level of standards compliance based on a percentage of the standard with which the organization in question complies (such as, for example, 70% compliance) or structuring the standard to provide certain "levels" of compliance, which the business or other organization can choose to pursue. (For example, there may be a "bronze," "silver," and "gold" level of compliance, each one indicating that the business meets certain further or more stringent requirements.)

To give an example of how this may work in practice, the popular and well-known ISO 9001 certification standard (for quality management) has been criticized since its inception as imposing an inordinate and often unnecessary paperwork burden, which has significant costs in both money and time, with many of its features being inapplicable to many businesses or even being driven by fads. An examination of the level of quality standard integration of the 2000 ISO 9000 standard (ISO 9000:2000) by Robert Sroufe and Sime Curkovic, entitled "An examination of ISO 9000:2000 and supply chain quality assurance" and published in the Journal of Operations Management (Volume 26, Issue 4, July 2008, pp. 503-520) noted that, up until that point, the relevant literature had been clearly divided as to its assessment of ISO 9000:2000, with around half of sourced articles indicating that it was "another paper-driven process that increases risk, uncertainty, and costs." This is a problem, since the certification procedure is strongly preferred (or even required) by many industry sectors and many clients, as an indication that the business is performing according to proper quality standards. Failure to comply with at least some level of the standard may be taken as an indication that the business cannot meet other contractual requirements, and may mean that the business loses significant amounts of revenue or even that it is unable to compete. One consequence of this has been that the bare-minimum documentation standards for a "minimum scope organization" audited under the ISO 9001 standard certification procedure have been trending downward since the early 2000s, with ISO 9001:2000 having the strictest documentation requirements, ISO 9001:2008 having looser minimum requirements, and ISO 9001:2015 having the loosest minimum requirements yet. This ensures that businesses can seek ISO 9001 certification (now required by certain sectors and certain clients) without imposing standards and processes that do not make sense for it or which do not make sense for certain areas of the business (such as certain departments, certain plants, and the like). Successor standards drafted based on the ISO 9000 experience, such as the ISO/IEC 27000 standards for information security, have likewise generally been formulated to be deliberately broad and unrestrictive in scope.

The need to juggle the requirements of the standard and the needs of the business (which may not be served by meeting that standard, or may be best served by meeting the requirements of the standard at a different level) has meant that standards compliance has become a hotbed for skilled consultants. Continuing with the ISO 9001 example, the need for businesses to get certification under this standard has been one of the primary vehicles for increasing consulting services. While quality in general has a positive effect on return on investment, market share, sales growth, better sales margins, and competitive advantage, this does not necessarily stem from strict adherence to the letter of the ISO 9001 standards, and a great deal of criticism of the standard has been to the effect that it misleads companies into thinking that certification entitles them to have better quality, undermining the need for the business to devise and keep to reasonable quality standards that make sense for their operation.

Similar issues are reflected in IT auditing, under the ISO 27000 standards and otherwise. The exact procedures that may be followed by an IT audit often depend on the nature and organization of the organization's IT infrastructure, policies, and operations, and, as such, it generally requires significant amounts of expertise and experience in order to determine proper recommendations and appropriate levels of standards compliance for a particular business or organization. This has meant that most IT audit services are not automated, and heretofore could not be automated (because of the highly qualitative nature of much of the audit process) which in turn means that they are time-consuming and labor intensive, and consequently expensive to carry out.

Discussing IT auditing generally, the primary function of an IT audit is generally to evaluate the systems that are in place for the purpose of safeguarding an organization's information. The audit, then, aims to evaluate the organization's ability to protect its information assets and to properly dispense information to authorized parties. Some sample considerations include the availability of the organization's systems (e.g. whether the systems will be available to properly dispense information at all times when required), the security and confidentiality inherent to use of the systems (e.g. whether the systems can properly identify authorized users and ensure that information is properly dispensed to them and only to them), the data integrity of the system (e.g. whether the information yielded by the system is generally accurate, reliable, and timely), and any other risks that may apply to certain specific systems. (For example, in certain fields like healthcare, there may be a greater need to comply with patient confidentiality laws, and the audit may require a certain amount of legal analysis in order to determine whether those laws are properly being complied with. In other fields, like defense, the threat profile of the business or other organization may be different. For certain businesses, like government contractors that work in both the healthcare and defense fields, each consideration may apply to certain components of their IT infrastructure but may not apply to other components of their IT infrastructure, which must be properly determined by the consultant.) Equally, there is a requirement to have standards in place for smaller unregulated entities which are as important as downtime, security breaches etc. can be as business crippling to them as a larger regulated entity. (In fact, often, such occurrences can be even more crippling to a smaller unregulated entity, since small entities often rely more heavily on the Internet than larger firms, rather than on well-developed distribution chains or pre-existing relationships with other entities. A smaller firm that does all of its business online will be relatively more badly hurt by downtime, and a smaller firm without an established reputation may find its business more damaged by a security breach.) As such, all businesses can benefit greatly from such standards implementation, though may need to prioritize different aspects; the relative impact of the standards process and of not implementing a part of the standards process each need to be considered for each business. This adds a significant amount of complexity.

Different IT audits may be applicable to different systems, or may be requested by different businesses, further complicating matters. Various taxonomies have been created to encompass these sets of audits, based on the intended purpose or based on the intended system under examination. For example, when auditing for a particular purpose, an audit might be conducted as a "technological innovation process audit," in which the audit involves constructing a risk profile for all of the projects (old and new) that the business or other organization has been conducting, or might be conducted as an "innovative comparison audit," in which the audit involves analyzing the innovative abilities of the company being audited in comparison to its competitors. (These generally involve analysis of a company's research facilities and related IT infrastructure). An audit may also be conducted as a "technological position audit," whereby the technologies that the business has already adopted are reviewed so that gaps can be identified and the business can determine what needs to be added. In another standard taxonomy, IT audits may be classified based on what systems are undergoing examination; one standard five-way or "general controls" audit looks specifically at systems and applications (which may entail determining whether systems are appropriate, efficient, and adequately controlled), information processing facilities (which may entail analyzing those facilities under both normal and potentially disruptive conditions), systems development (which may entail determining whether the systems currently under development or in the process of implementation meet the objectives of the organization and meet all other requirements for new software), management (which may entail determining whether IT personnel have developed an efficient and effective organizational structure), and telecommunications (which may entail ensuring that telecommunications controls are present on every essential device on a network, from the client to the server and including any intervening stages). Other taxonomies may separate IT audits into "general control review" and "application control review" audits. In many cases, different audits within the taxonomy may have to be conducted by different experts or different firms, depending on the type of expertise that is necessary.

Audits can also be divided into "internal" and "external" audits. Internal audits are conducted by the personnel of the organization, often by dedicated corporate internal auditors. (An information technology audit may overlap with other types of audits, such as a financial audit.) An external auditor may then be contracted to review the filings of the internal audit, and conduct their own independent review.

Traditionally, IT audit services for an external audit are set-out in an engagement letter which is often secured through a proposal or tendering process. (Similar letters are often provided in internal audits to provide notice and scope of the upcoming audit, with external audit letters often being more complex and further including topics like legal liability.) The resources of the external auditor, such as staff, may then be used to manually gather data. In traditional audits, the performance of collection of data is almost always an onsite process with all resources located at the organization being audited. This means that auditing resources may be required at multiple locations, or deployed in series to sufficiently cover the sites of operations.

The external auditor may then conduct a verification process, usually collecting as much data as possible directly from the source without human interference, thus decreasing the verification process needed to ensure that data is complete, accurate, and valid. This involves the steps of inquiry (e.g. asking appropriate management personnel or other organizational staff about procedures), inspection (e.g. determination whether those procedures are actually being performed), observation (e.g. determination of what procedures occur in the absence of documentation), and re-performance (e.g. having the auditor perform a particular control in the absence of evidence that it is operating effectively, for final verification). When it comes to reporting the findings, these are manually captured and aggregated into a document and distributed via email. Should any remediation be required, it is necessary to perform a follow-up audit. An example audit process is depicted in prior art FIG. 11.

As discussed above, certain systems that businesses or other organizations may be operating can significantly complicate analysis. For example, further challenges and problems arise with larger groups which are made up of multiple entities with a high number of employees, covering a range of industries, located on a number of different sites, with a large number of domains and using different IT systems. There is often no common infrastructure and no baseline standards, and the IT environments or landscapes vary in size, complexity, posture and maturity. There are also limitations with regards to budget, scalability and capacity of the IT assurance function, meaning that the complexity of the system often exceeds the capacity of the auditor to perform the audit. Due to the costs and limitations of manual review, the auditor often must perform a risk-based auditing approach, effectively a "good-enough" approach, that might determine whether the system has met certain minimum standards or that might determine that particularly critical systems are compliant, without analyzing the system for compliance with other requirements or analyzing less apparently critical systems. This can mean that major, unexpected security holes can be missed in their entirety by an auditor who would have caught them if they were in a more critical-appearing system. With the introduction and adoption of progressive technologies like cloud, "internet of things" devices (IOT), and big data being introduced into the IT environment, auditors not only have to stay abreast of these progressive technologies, they need to understand the associated risks and how to audit them.

Some software has been created to facilitate the audit process and assist auditors. Many of the software tools presently on the market have similar capabilities to one another, and are generally limited in applicability to specialized, isolated areas within an IT audit. A discussion of a selection of them for demonstrative purposes follows.

CELONIS is a process auditing and visualization software, which may be used to analyze and visualize certain processes in a company. Its solutions analyze procurement, human resource, information technology service management, logistics, production, accounting, sales, audit, and other branch specific processes through on-premise installation or software-as-a-service implementation aspects. For example, CELONIS offers certain tools for IT systems that can be used to visualize what is driving the majority of IT tickets, and can be used to help determine where solution times and First Level Support can be optimized and accelerated. It also can be used to help analyze ticket wait times, or the wait times of certain tickets, in order to determine where complexities or confusion complicate certain matters, cause time-consuming ticket "ping-pong," or even cause outright circumvention of the ticket system. Having this data available can help personnel be optimized in an IT department.

While CELONIS can automate certain aspects of data collection which may be of interest to an IT auditor, CELONIS cannot automate an audit evaluation. As discussed, CELONIS is responsible for reconstructing and visualizing processes, thereby detecting deficiencies automatically and analyzing processing times and detecting bottlenecks. The inputs into CELONIS are specifically focused on data from a database rather than inputs in the form of scanned documents or unstructured data.

A similar system, KPMG SOFY, has similar shortcomings. This system is a process auditing software that is not IT audit focused (but which may similarly be used to assist IT audits) and involves a specific client implementation that is customized to the organizations' IT systems. It provides process insights, tax and data quality insights. It is also a risk management platform which also has access control monitoring capabilities, which is, again, useful for IT audits. However, KPMG SOFY is similarly unavailable to develop its own data, similarly being unable to operate without data being provided from a database.

Other tools may be useful to an IT auditor for other purposes. For example, certain IT environment scanning and reporting software tools may be in common use.

One example is SPICEWORKS NETWORK MONITOR, a software suite focused on improving the ability of IT professionals to discover, manage and monitor the software and hardware assets in their networks. This tool has features such as internet protocol (IP) scanning, remote support, inventory management and reporting, network monitoring, connectivity dashboard, and many others. Whilst these operational insights are critical to proper IT management, and the tool can be used to facilitate certain aspects of the audit such as the "re-performance" step, this tool is not configured to carry out IT audits on its own, and cannot take any proactive action in this regard. For example, the tool cannot be used to provide an audit opinion of the environment against industry and best practice standards, based on the network traffic that it has captured, analyzed, or monitored.

Other IT environment scanning and reporting software, which are not audit focused, include SPLUNK and ZABBIX.

SPLUNK is an analytics platform and security information and event management (SIEM) solution that offers some data collection mechanisms and various tools to analyze and display results. The SPLUNK system is specifically intended for searching, monitoring, and analyzing machine-generated "big data," via a Web-style interface, which may be used in order to make this machine data more accessible across the organization as a whole by identifying data patterns, providing metrics, diagnosing problems, and providing intelligence for business operations. This core SPLUNK package makes use of a standard API to connect directly to certain applications and devices on a network.

SPLUNK has several additional offerings that may be integrated with this core package in order to provide additional functionality. For example, SPLUNK ENTERPRISE SECURITY software is used to provide the SIEM solutions discussed earlier. This software detects and responds to internal and external attacks on the IT environment, in a similar fashion to other security solutions. SPLUNK ENTERPRISE SECURITY then offers various analytics having to do with these security events, which allow metrics like "risk modifiers" to be computed and tracked over time. It simplifies threat management while minimizing risk and safeguarding the business using it, allowing the business to identify, prioritize, and manage security events by providing event sequencing and alert management functionality, risk score calculation, and customizable dashboards and visualizations.

SPLUNK ENTERPRISE SECURITY, however, does not provide any ability to collate its data with data from other security tools, such as OpenVAS, Nessus, MBSA, NMap, or others, which might be used as part of an audit. Likewise, the SPLUNK ENTERPRISE SECURITY system does not apply its results to audit standards in a manner that allows the results to be analyzed based on whether the audit standards are met or not. Finally, while SPLUNK ENTERPRISE SECURITY provides some metrics regarding risks and recommendations, it does not provide these metrics in a manner that contextualizes them in the form of audit standards or compliance to standards. This software is also not audit friendly.

SPLUNK QUICK START BUNDLES group applications and connectors from other companies or businesses into SPLUNK. This software, likewise, does not provide audit or compliance reviews. This software can match results to compliance standards, but is limited in how it can be applied. Specifically, it is limited to network and data sections, rather than the whole IT auditing standard suite. While this is useful, it still means that SPLUNK does not provide end-to-end processing of an IT audit.

As such, even in view of all of the capabilities of the SPLUNK software suite, there is still a need to bridge all of the disparate software solutions in such a manner that the outputs of the software can be analyzed and used as the basis for recommendations. The ability to automate such processing would likely mean that this information can be provided at a fraction of the cost of other existing software.

Another problem with existing systems such as SPLUNK that have "connectors" or otherwise interact with other information sources is that, in almost all cases, such data collection is limited to "point-in-time" or "batch" collection, whereby information must be specifically retrieved from the information source at a designated time, and all other processing must be put on hold until the processing is completed. This frustrates any attempt to use such software in continuous operation.

ZABBIX is another network platform that collects data and provides it back to the user. Specifically, ZABBIX is an open-source monitoring software tool that can incorporate a variety of diverse IT components, such as networks, servers, virtual machines, and cloud services. ZABBIX may provide certain operational metrics for each of these devices, such as network utilization, CPU load, disk space consumption, and others; ZABBIX also includes or supports other functionality like system availability monitoring and an audit log. However, a problem with ZABBIX is that ZABBIX is unable to translate the data that it collects in a manner that allows the data to be combined with documents and governance structures in order to provide availability information (or other information) useful to an IT audit of the IT environment.

Other existing software suites are broadly similar to the above at best, generally duplicating some or all of the features of the above software. As such, a general problem with the above software, and with all other similar software provided in the art, is that such software only provides gathered data back to the users through interfaces and alerts. No software is able to collect all the data necessary for an audit on its own, or digest the results of multiple data sources such that the data can be combined into an amalgamated form that serves as a single view of the IT audit landscape, which can then be provided to IT auditors or others in order to allow them to better visualize the state of the IT system of a business or organization and how it comports with applicable standards. Neither do any of the systems provided in the art allow recommendations to be generated to an auditor or even for a user based on the data gathered. Essentially, all that the existing software systems typically do is to avail data for analysis by humans.

The existing platforms mentioned above require extensive product knowledge to implement. This can often mean that there are significant implementation costs associated with integrating the tools into the environment of the organization. Subsequent training may be required in order to derive maximum value from the tools and features.

Many of the similar products mentioned above have been built to function with a specified or limited number of systems. These aforementioned products will only report on results for that fit-for-purpose system and will not consolidate outcomes from two or more applications in the environment. This will often result in the auditor needing to review outcomes from multiple tools in order to cover the critical applications in the organization and provide a consolidated risk report that has to be manually prepared.

In assessing the capabilities of existing platforms and designs for the system, there are a number of challenges that thus far have prevented adoption of a single-view of the audit procedure. One of these challenges is the legal ramifications of co-development between parties who are generally in competition for business. A competitor may not want to reveal the crown-jewels of their methodology through co-development and would want exclusivity for certain content and features. This is particularly difficult to carve out of a single software application. The ability to ring-fence certain aspects and features is not supported by any of the software discussed above. The requirement to share intellectual property also creates a misalignment between the legalities and technicalities of working in a co-development relationship. A unique solution is thus required to provide an API gateway platform where development can take place in isolation and can leverage off existing of new development in a collaborative manner.

The need to have the program function while some undetermined aspects of it are kept in isolation from one another adds greatly to the technical complexity. The scarcity of talent with the necessary skills and expertise to build this solution means that significant capacity constraints will exist in any development team. This adds to the fact that any given development team is going to lack subject matter experts across all the broad areas across which the audit is to be performed, requiring collaboration and co-development with consultation and insight from third-parties. Whereas such, not only must the system be developed, but the system must then be operable to allow the content and contribution of a subject matter expert to be introduced into an ecosystem of other contributions and where the usage or referrals for the specific content is measurable, controlled, monitored and where necessary expanded upon.

The complexity of the problem also has meant that any attempt to research a solution would be hampered by extensive resource constraints. This sort of extensive resource injection is generally unfeasible for most development teams outside of those operated by large and profitable companies. While in some cases, like with open-source software, it has been possible to heavily decentralize development and create projects that would otherwise have required an extensive development team with varying skills, the nature of the project makes this approach inherently troublesome as well, since the project must be very carefully planned. For example, individual contributions may not be directly aligned with the "ring fences" or may be reliant on content that may need to be "ring fenced" off.

Further business concerns would likewise complicate the process of implementing any solution. For example, it may be difficult to effectively market and distribute a project that has been based on the efforts of a large number of voluntary contributors, and may be difficult to continue to solicit such contributions and continue development once marketing and distribution has started. As such, many technical solutions would not be viable for business reasons as well as technical reasons. A unique solution would therefore be required that allowed for value to be derived by sales and marketing partners together with contributors, in a mutually beneficial arrangement.

SUMMARY

According to an exemplary embodiment, an automated, novel and inventive system for implementing a platform for facilitating an IT audit may be provided. Specifically, it may be contemplated that an exemplary embodiment of the present system may provide an integrated and automated solution for an IT auditing system to provide an audit solution in a manner that does not require human effort or involvement, effectively allowing for digitization of an IT audit workforce, and which provides audit-as-a-service and avails IT security assurance on any IT environment, irrespective of the size, complexity, posture or maturity of the IT environment.

An IT audit system may be a platform on which subject matter experts may contribute their expertise to a shared pool of resources. Clients may select and choose their audits based on the available components on the platform and customize the combination as appropriate. The present system may provide a manner for organizations who lack specific subject matter experts or have a scarcity of inhouse IT audit and security specialists to purchase these services from the inventive system, thereby providing greater digital enablement of IT auditing strategies.

An exemplary embodiment of such a system may be configured to perform network scans and count devices and logs, and may further be configured to perform IT audits against specific standards, analyze process maturity, and analyze physical documents and written policies. In certain exemplary embodiments, the system may be equipped to obtain data from various sources including tools such as some of those described above, interpret the logs and findings of these tools, and generate recommendations based on those logs and findings, which may enable auditors and their stakeholders to understand context and risk within the standards that the results are measured against. According to an exemplary embodiment, the present system may integrate any of the above-mentioned tools or other IT monitoring tools, but may be configured to be able to generate recommendations based on the data which is extracted from these tools as well as other data manually submitted to the invention. In an exemplary embodiment, data may be aggregated, and recommendations may be generated, in a form directed at any potential viewer, such as a user, company, group of companies, client or customer.

This data obtained from software tools such as are described above, along with other process and physical data, may be used by an exemplary embodiment of a platform such as is contemplated herein in order to audit the IT environment automatically against IT auditing standards. As discussed, existing tools only provide gathered data back to the users through interfaces and alerts, without providing any ability to incorporate data from a variety of sources such that multiple sources can be amalgamated into a single-view of the audit landscape, and such that recommendations regarding standards compliance can be drawn from this single view. The presently contemplated platform thus may provide an always-on audit, compliance and monitoring system and method.

It is noted that, while it is contemplated that exemplary embodiments described herein provide a platform that may be useful in performing or assisting an IT audit, similar platforms or even a combined platform may also be used to perform audits over other processes such as financial controls, supplement the efforts of a manual auditor, or may be used to automatically perform only a limited part of an IT audit according to the taxonomies listed previously. For example, an "IT audit" may encompass a variety of IT audit reviews, such as IT general controls, cybersecurity hygiene, software licensing, and other IT audit reviews. An exemplary embodiment of a platform may function to perform any or all of these, such as just the general controls review, just the cybersecurity hygiene review, and so forth, and may then amalgamate its results with the results of a manual review. (The platform may also perform automatic review in circumstances where a manual review has been performed, and amalgamate both sets of results.) The platform may then generate recommendations based on the amalgamated data.

In a first exemplary embodiment, there may be provided a system for facilitating an automated IT audit, which as discussed may be centered around a platform configured to facilitate the automated IT audit. This platform may include a frontend configured to allow one or more users to access and manage the platform; a network connecting the frontend to a backend; and a data collection system configured to gather data from one or more sources in an IT environment to be used for the IT audit. The backend may include at least one server configured to send, receive, store and process data, and may also include a testing and analyzing system which may include appropriate algorithms, machine learning and artificial intelligence, with this testing and analyzing system configured to test and analyze the data gathered by the collection system against pre-configured best practice standards and/or policies. The platform may further include a reporting component, which may be configured to transmit the tested and analyzed data to the frontend, wherein this data may be presented on the frontend for the one or more users to access and manage or interrogate.

A variety of users and user types may be contemplated, such as one or more administrators. An administrator may be a user provided with special permissions to access, manage and monitor the platform in a manner not permitted to regular users. Various forms of administrator may be contemplated. For example, in an exemplary embodiment, an administrator may be an authorized user of one of an authorized group of companies. The platform may include a portal which allows for management of the platform by the administrator. In an exemplary embodiment, administrator rights may be restricted to one user, or a small number of users, within the company, with "users" encompassing the administrator(s) and other employees of the one or more companies. It may further be contemplated that, while exemplary embodiments of the platform may be tailored to particular users or sets of users, or particular organizations or sets of organizations, the platform may not be limited to corporate applications, and may be used by all other entities, optionally with additional functionality or different functionality based on the nature of the organization. The platform may also be operated by a subcomponent of an organization, without equivalent rights being shared by the organization as a whole. As such, where reference is made to a company, the term company should be considered to include entities including businesses, divisions, departments, or the like, which may form part of a larger group thereof. In certain cases, it may also be contemplated to have rights be shared between organizations, such that, for example, a platform is managed by an administrator employed by a government organization and an administrator at a government contractor retained by the government organization to develop their IT infrastructure.

According to an exemplary embodiment, the platform may be used to provide an IT audit, or certain IT audit services, in a manner that allows the IT audit to be initiated from an online marketplace. In an exemplary embodiment, the platform may have remote access functionality that allows a client to install platform software in particular locations, upload necessary physical documents so as to make them accessible to the platform, and then have the platform initiate the IT audit. The platform may also be configured to track its usage according to a billing algorithm, such that a client is billed for particular services, for the amount of time or other resources spent on performing the selected services (for example, server time of the auditor business), or may otherwise provide flexible and tailored purchasing and billing options.

In an exemplary embodiment, the platform may be modular and scalable, such that the platform may be tailored to suit the needs and/or requirements of a company, a group of companies, and users. For example, according to an exemplary embodiment, the audit services provided by the platform may be provided in the form of modules, skills or controls, with the client subscribing to particular modules, skills or controls based on need. This allows for clients to customize their audit requirements and use of the platform with minimal impact to their environment as components can be purchased on an as-needed basis and grouped together in a unique configuration for the client.

In an exemplary embodiment, the modules used may be tailored based on the risk profile of a company, or of the group of companies. In such an exemplary embodiment, the group of companies may correspond to, for example, companies in a particular industry segment (which may face attacks from similar threats or types of threats, such as industrial espionage attempts in a R&D-heavy industry segment), companies in a particular geographical area (which may, for example, face particularly sophisticated social engineering attacks from a skilled criminal element in the area), companies in a particular climate or which are operating on certain infrastructure (it may, for example, be contemplated to analyze factors like a likelihood of natural disasters like hurricanes, or an "availability factor" of the local power infrastructure, as part of an availability analysis), or any other such grouping of companies such as may be desired.

Some exemplary embodiments of modules that may be included or which otherwise may be available are as follows. A first exemplary module may be a module for IT audit review, which may be equipped to perform every element of an IT audit review and which may potentially be combinable with other audit modules, including non-IT audit modules (such as financial audit modules), if desired. Another exemplary module may be an audit readiness review module, which may be run initially in order to populate an audit readiness checklist for the company's IT infrastructure (or any other infrastructure such as may be desired) and provide the result to the company in order to allow them to better prepare for an audit, by, for example, telling the company what needs to be done and how long it is likely to take. Another exemplary module may be used to analyze particular software or hardware, and may, for example, provide patch management review and vulnerability scanning, or network inventory review of hardware and software. Another exemplary module may be used to analyze the security of systems that the company is dependent on, such as the controller of the company's Web domain, and may, for example, conduct a domain controller security review. Another exemplary module may be a security hardening review module, which may be equipped to test the hardening of the company's IT infrastructure against attacks.

A further module may include a license optimization review module or other software asset management module, which may determine which software may be preferable for a company to use, or which licenses to that software may be preferable, based on the company's actual needs. (This may include, for example, an evaluation of the company's software usage as well as an evaluation of the company's requirements for software license terms. Part of this analysis may include, for example, an evaluation of which software is installed on which machines, whether the software functions as stand-alone software that can be licensed separately or whether it must be licensed as part of a software suite, who uses the machines and what their requirements are, how the machine is configured, and what dependencies the machine has on other devices and what requirements it has for inputs/outputs, and comparison of all of these attributes to the company's actual license in order to determine whether the company has a license that accurately reflects its needs. For example, it may be determined that the company has several independent licenses to the same software, maintained by different departments, which could be consolidated into a cheaper overall license. Or, it may be determined that a software license that allows for thirty simultaneous users is never actually used by more than two at a time, allowing the scope of the license to be reduced. It may also be determined that a free software alternative exists under license terms that the company has specified are acceptable or which the company has specified are acceptable in that context; for example, the company may specify that the MIT license is acceptable but that the GNU General Public License is not, restricting the scope of alternatives.) Another module may be a vendor management review module, which may provide similar functionality when evaluating the vendors that the company is using and the specific agreements that the company has with those vendors.

A further module may include a cloud readiness review module, which may assess technology, people, and processes operated by the company in order to determine what data should be stored locally and what data could be uploaded to a cloud database or otherwise integrated with the cloud. Another module may provide operating monitoring review, which may evaluate the overall operations of the company's IT systems. Another module may be a legal compliance module, intended to evaluate the company's compliance with particular laws or regulations, or an ethical compliance module, intended to evaluate the company's compliance with certain ethical codes or social standards. One example might be a King IV reporting review module, which may evaluate aspects of the company's governing structure in order to ensure compliance with the South African "King Code," a set of principles and practices intended to help guarantee accountability, fairness, and transparency in organizational conduct. Another module may provide certification readiness review, intended to evaluate whether the company is in a good position to apply for or receive a particular certification or begin a certification audit.

An exemplary embodiment of skills that may be included or which otherwise may be available are as follows: A first exemplary skill may be a reading skill to be able to recognize specific information in a scanned document. This information may relate to a policy at this present time, but may be trained to later read contracts, agreements, and other documents.

In an exemplary embodiment, an audit performed by the platform may include the automated collection, storage, analysis and reporting of IT environment and cyber security data, which may include steps of comparing this data against various IT best practice standards and/or company policies. The platform may be configured to perform audits against specific standards, analyze process maturity and physical documents and written policies. The standards may be legal or regulatory, or may be certificatory or voluntary, such as ISO270001, which provides specific requirements for an information security management system (ISMS). The standards may include, for example, standards regarding password management, using password management technology, procedures for periodic review of access, and so forth.

In an exemplary embodiment, data may be collected from various sources, including IT monitoring tools and applications. Once this data is collected, the platform may then interpret the logs and findings from the collected data, and may translate the results for auditors and the stakeholders, in such a manner as to enable the auditors and stakeholders understand context and risk within the standards that they are measured against. According to an exemplary embodiment, in order to facilitate collection of data, the platform may be configured to allow for the connection of existing tools and applications, which may allow data to be uploaded directly from those existing tools and applications. The platform may then be configured to generate recommendations based on the data extracted from the IT monitoring tools and applications using cognitive automation, rule configuration analysis, machine learning and artificial intelligence. The platform may generate recommendations based on the data gathered and may amalgamate multiple sources in a manner that focuses the sources into a single-view of the IT audit landscape. For example, in an exemplary embodiment, the platform may be configured to connect to security tools such as SPLUNK, OPENVAS, NESSUS, MBSA, NMAP, etc., collate the results and apply them to audit standards, as well as translate the risks and make recommendations to different users like the user, administrator, company or group on how to comply with the standards. For example, the platform may consume the core information from SPLUNK and may then combine it with governance and manual processes. The platform may then translate this evidence into new evidence that is compatible with an auditing process ("audit-friendly") and may then apply it to audit standards.

An exemplary embodiment of the present platform may thereby generally provide an integrated and automated solution of an IT audit function, that does not require human effort or involvement. (Again, however, in exemplary embodiments of the platform, the platform may also operate alongside a human auditor as an aid. It may also be contemplated to have the human auditor be able to intervene or elect to become involved based, for example, on preliminary status reports, such as if the human auditor notices something unusual or believes that the company represents a special case distinguishable from other similar companies. It may further be contemplated to have the platform be expandable with additional functionality, for auditing any other records or controls such as financial controls or customizable compliance auditing procedures like compliance with the terms of a specific contract or even potentially the claims of a specific patent.

According to an exemplary embodiment, a platform such as is contemplated herein may be implemented on a network that may be virtual or physical. The platform may, for example, be configured to make use of cloud computing, such that the platform may be configured to operate on a cloud computing platform. The cloud computing platform may include GOOGLE CLOUD PLATFORM or another such platform, such as may be desired. In an exemplary embodiment, the platform may operate in a virtual space with cloud services being used by various users or companies which form part of a group of users or companies. This may improve the overall security of the platform by ensuring that there are no networks to breach or custom servers to penetrate.

According to an exemplary embodiment, a cloud platform or combination of platforms may be selected or implemented in order to provide certain usage functionality, including audit logging, URL reputation management (which may, for example, provide an indication of whether a URL is considered to be trusted or untrusted), binary reputation (which may, for example, provide an indication of whether any downloadable files, such as non-text or "binary" files, are legitimate) login reputation management, in-app reputation management, and any other such usage functionality. Likewise, a platform or combination of platforms may be selected or implemented in order to provide certain operations functionality, such as providing automatic updates and patching to some or all software services through the cloud program, securing all data with a set of uniform secure best practices and configurations, performing threat analysis and applicable intelligence collection applicable to a broad set of related data sets (such as other data stored on a cloud system), performing data forensics, performing anomaly detection, and performing organized incident response. (For example, in an exemplary embodiment, the step of performing threat analysis may include inspecting items with a set of virus and malware scanners or other software in order to ensure that the data uploaded to the platform is safe. One example of such a system, GOOGLE's VIRUSTOTAL program, may inspect items with over 70 antivirus scanners and URL/domain blacklisting services, in addition to other tools that can be used to inspect certain specific signals in the studied content.) It may also be contemplated to have the platform simply provide recommendations for remediation of each of these features by the entity being audited or reviewed, which may ensure that the platform can remain independent from each of the software services in question.

Likewise, a platform or combination of platforms may be selected or implemented in order to provide certain deployment functionality, such as providing an unphishable hardware second factor such as a physical location of the hardware, implementing the TLS cryptographic protocol (or another cryptographic protocol) for all communications, performing DDOS protection through appropriate allocation of resources among the entirety of a cloud system (e.g. load balancing software and the like), performing TLS certificate pinning to the cloud system specifically, and any other deployment functionality that may be desired. (Other such access control functionality or other deployment functionality, such as firewall and access control software, may also be contemplated to be implemented, which may, if desired, operate under a "default deny" system where traffic is restricted unless it is specifically authorized.) Likewise, a platform may be configured to perform certain application functionality, such as application vulnerability scanning, binary verification, source code provenance, third-party code reputation management, and automatic enforcement of peer review for all changes to important aspects of the cloud software. A platform may be configured to have certain storage functionality, such as storage encryption, storage Identity and Access Management (IAM), and logging. A platform may be configured to have certain operating system (OS) and inter-process communication (IPC) functionality, such as the use of a custom-hardened kernel for cloud operations, authentication for each host and each job, and the use of curated images. The platform may be configured to have certain boot functionality, such as the use of a trusted boot process and the use of cryptographic credentials. Finally, in some exemplary embodiments, the platform may make use of purpose-built hardware, including purpose-built chips, purpose-built servers, purpose-built storage, purpose-built network infrastructure, and purpose-built data centers, which may improve overall security and optimize the functions of the overall infrastructure.

According to an exemplary embodiment, the platform frontend may include an application engine, which may be connectable to a variety of devices on which data may be displayed or commands may be executed, such as a mobile phone, laptop, tablet, personal computer or similar computing device. The connection is wireless or wired (via a cable), such as may be desired.

According to an exemplary embodiment, the platform backend may include an application engine. The frontend application engine may be connected to the backend application engine. The backend may also include data storage, such as cloud data storage. An exemplary server used as part of the platform may be a cloud-based server.

The platform may be contemplated as being deployable simultaneously in any number of IT environments that range in geographical location, IT maturity, complexity of systems, posture and size of infrastructure and users. In various exemplary embodiments, the platform may be adapted for the different IT environments through methods such as those discussed above. (One example is that a legal compliance module may be regional or geographical, such that the company undergoing the audit is only examined based on the laws to which it is actually subject.) The platform may not be limited by the scale of the environment in which it is deployed into, and can cover any range of applications and sub-applications. The platform may connect to and interact with data in a remote and automated manner.

According to an exemplary embodiment, data may be gathered by a collecting system. The collecting system may include connectors (essentially, links between one type of data structure or format and another type) and may also include a web user interface (UI) for manual collection of data. In various exemplary embodiments, it may be contemplated to have the connectors be specifically tailored to a certain type of data structure, format, or program, and may further be contemplated to have generic connectors which may be configured to collect data from any data source that could be mapped by the front end user via the user interface to classify certain data fields. This may allow for new connectors to be developed relatively easily, allowing for, for example, proprietary data formats or unusual data formats to be collected given enough customization. The collecting system may be connected to the testing and analyzing system of the backend.

In particular, in an exemplary embodiment, the collecting system may be configured such that information may be collected in such a manner as to provide continuous auditing, such that information is collected and evidence is audited simultaneously, without pausing information collection for evidence auditing or vice-versa. (In some cases, this may be a function of the collection system or of individual connectors defined therein. According to an exemplary embodiment, the collecting system may be configured to use "point-in-time" or batch collection instead of, or in addition to, continuous data collection; for example, there may be circumstances in which a particular system is so rarely used as to eliminate most of the need to write and implement a custom connector, or there may be circumstances in which a particular system is a legacy system that is somewhat poorly understood and a legacy connector must be used, each of which may require "point-in-time" data collection.)

According to an exemplary embodiment, the connectors may utilize a buffer system such as the publish/subscribe pattern (or PUB SUB) to feed data into the cloud. The connectors may be run based on a schedule configured by the user via the frontend. The connectors may be centrally deployed and may remotely access the applications/computers as necessary to pull relevant data utilizing relevant remote technologies such as WMI, API, SQL or Remote Registry.

According to an exemplary embodiment, the connectors may form a connector framework which is connected to the backend. The connector framework may function as the primary mechanism for receiving data. All connectors may be based on a standard open source framework. The platform may support the addition of new connectors, which may be written or uploaded by the user, administrator or companies. The platform may support the addition of new standards, with the standards being provided in writing. All connectors set up may be viewed and managed via a user interface. The user interface may be the same web UI described above.

In an exemplary embodiment, the platform may be configured to operate in IT environments enabled virtually, through deployment of the connectors into the IT environment, with the data processing being performed in the cloud. In such an embodiment, the platform may be connected to new connectors regularly, wherein the new connectors are deployed regularly.

Exemplary embodiments of connectors that may be incorporated into the present platform may be described herein. A first type of connector may be a scanning tool that collects environmental data such as internet protocol (IP) addresses, device names and installed software. A second type of connector may be a connector that uses existing application programming interfaces (APIs) or direct logins to collect data directly from an application or an application database.

According to an exemplary embodiment of a first type of connector, a first type of connector may be provided with domain administrator credentials, such as a domain administrator username and password, which may be used to scan the local environmental data. For example, according to an exemplary embodiment, the platform may be assigned its own unique domain administrator credentials, such that the domain administrator credentials available to the platform can be appropriately limited and can be maintained in the local environment without being communicated to the web or to any other outside environment, such as GOOGLE CLOUD PLATFORM.

According to an exemplary embodiment of a second type of connector, a second type of connector may be provided with the API information or the direct login credential information by an operator of the platform, and may be maintained in a local environment in an encrypted form. (This may, for example, include credentials to access one or more cloud systems as well as one or more local systems, allowing the platform to perform one or more scans on cloud systems; such credentials may likewise be stored in this sequestered space or "secure vault.") According to an exemplary embodiment, the credentials may be stored in such a fashion that they are not connected or communicated to the web or to any other outside environment, such as GOOGLE CLOUD PLATFORM, and may likewise be a set of credentials uniquely corresponding to the platform rather than being shared between the platform and one or more other parties.

In an exemplary embodiment, either of the types of connectors (such as the first "scanner-type" connector and the second "API/login-type" connector) may be integrated with other software or other software modules. For example, according to an exemplary embodiment, a connector may be paired with a security module that may, upon scanning the local environment to retrieve data or upon retrieving data from a particular API or other program, identify one or more security weaknesses in the local environment or in the use of the particular program, and may then alert the customer of the security weaknesses identified. Integration with other modules may also be contemplated, such as may be desired.

For example, according to an exemplary embodiment whereby a connector is paired with a security module, a connector may first be kicked off in order to run against an on-premise or cloud environment. For example, in one exemplary embodiment, a connector may be used in order to collect data from the Active Directory. The data and records that may then be collected by the connector may then be transmitted to the platform backend, where processing may in some exemplary embodiments be suspended in a queued state until the connector has successfully completed the scan. (In other exemplary embodiments, steps like preprocessing may be taken when the data and records are being collected by the connector, if desired; in other exemplary embodiments, the process may run in parallel with other processes that place a greater demand on system resources.) Once a completed data set is received by the security module, the security module may operate to process the completed data set against predefined rules, logic, and machine learning algorithms. For example, according to an exemplary embodiment, one predefined rule that may be specified for the platform may be to identify all Active Directory accounts that have not changed their passwords, or which have not changed their passwords in a specified period of time. The result may then be displayed as an outcome or as part of a dashboard that may be viewable by the client through their front-end web user interface. Various results and visualizations of this process may be contemplated, such as, for example, a listing of all of the users that have not changed their passwords. The security module may then, if desired, take further steps based on this finding; for example, in an exemplary embodiment, it may be contemplated that the security module may send alerts resulting in email, text, or other push notifications, such as may be desired For example, it may be contemplated to have the security module send an email to an administrator after the conclusion of the operation, advising the administrator of the new outcome in the platform related to Active Directory. Variations on this process may also be considered; for example, it may be contemplated to have a customizable alert be sent to the administrator such that the administrator can specify what information should be conveyed, such as providing a level of compliance with password procedures as a percentage within the message subject header.

In an exemplary embodiment, the connectors may include locally-situated, or "on-premise," connectors located in a user's IT environment, which may allow for the automatic collection of data. The connectors may include cloud-based connectors that interface through the web UI. In certain exemplary embodiments, data may be collected by the connectors from source data in a structured form, or alternatively may be collected in an unstructured form.

According to an exemplary embodiment, the overall platform may be configured to test data provided in either structured form or unstructured form, such as may be desired, which may offer numerous advantages over other systems like CELONIS. For example, according to an exemplary embodiment, when unstructured data is determined to have been collected by a connector which may take the form of an uploaded document (such as a PDF) or an image (such as a JPEG) it may then be subject to a machine learning process to convert the contents of the document or image into text, which may in some exemplary embodiments be a comprehensive cognitive automation process to ascertain and interpret the text as the required evidence and tabulate this into structured data, in order to convert the data into a format onto which the overall platform can then apply audit rules. For example, in one exemplary embodiment, it may be contemplated that, once the user has uploaded data in some interpretable form, such as in the form of a JPEG or PNG, the platform may apply optical character recognition in order to determine that there is a checkbox square in close connection to the term "Enabled," which may be used in order to determine that the checkbox corresponds to a state of having a particular element be disabled or enabled. The platform may then visually interpret the checkbox in order to determine that it has been checked, indicating that the element is in an enabled state rather than a disabled one. This may, for example, cause the platform to return a result of 1 for the setting (rather than 0) if the setting is a known setting, indicating that the setting is configured correctly, or may cause the platform to create an entry for the setting if the setting is not a known setting, allowing it to be interpreted later, for example by a generic connector or by a modified existing connector that is configured to interpret uploaded data.

It may further be contemplated that, as an extension of the capabilities of the platform to interpret unstructured data, the platform may further be configured to interpret data that is structured according to an unfamiliar form, giving the platform the ability to interpret data even in the case where the source of the data is not a pre-specified system with a well-defined connector. In such an exemplary embodiment, once the platform performs a machine learning process to translate the unfamiliar data structure into a familiar data structure, the unfamiliar data structure and the familiar data structure may be compared and a new connector may be automatically developed by the platform, based on the differences between the unfamiliar and the familiar data structure.

In an exemplary embodiment, the connectors may be used to collect user account information, security configurations data, application-specific information, or system-specific information. User account information may include, for example, staff numbers, login data, username, permissions, name and surname, and status. In addition to the above, user account information may also include any other connected information for the employee, such as human resource information like termination dates, email, engagement dates and title. Such information may be used by the platform in order to, for example, identify unused or seldom-used user accounts, or duplicate user accounts, such as may be desired. In an exemplary embodiment, the platform may further collect information about the user account creation process, such as the speed of creation and approval of new user accounts, the history of modification of user accounts, the speed with which the organization eliminates the user accounts of (or the privileges of, or otherwise controls access for) users that have left the organization. This may allow risk to be determined for the process as a whole, as well as on a per-user basis, if desired.

Security configurations data may, for example, be collected from each application and profile group or role configuration, and may include data on basic password parameters, use of root keys, blocked IP addresses, and so forth. In many embodiments, security configuration data from different programs or systems may share common settings, but may also include some unique settings that are only enforced by a specific grouping of users or role.

Application- or process-specific information may include data which is based on the operational functions of that control. Examples of application- or process-specific information include such information as backup schedules, backup status, antivirus scope, cloud deployments, and devices on the network, amongst others.

In an exemplary embodiment, the connectors may be enabled virtually with limited performance impact on any network or computer processing unit (CPU) of the IT environment. In some exemplary embodiments, the platform may be integrated with multiple connectors configured to operate simultaneously, such that connectors may be simultaneously deployed. A variety of deployment mechanisms are available, which may include, for example, existing supported deployment mechanisms which may be provided by the system provider, or self-developed deployment mechanisms which may be implemented by the user themselves.

In an exemplary embodiment, the connectors may be configured to require a unique login by a registered organization administrator upon set up. This may ensure that secure data is not transferred without authorization. (In other exemplary embodiments, other methods for securing data, such as anonymization of the data or encryption of the data, may be contemplated, and may be used instead or additionally.) The connector framework forms an interface which uses certificates to encrypt the connector interface traffic. The connectors may make use of credentials with appropriate levels of permissions, which may be provided by the user and which may remain within the user's environment in an encrypted format. The data may be transmitted to the backend from the connectors through a hypertext transfer protocol secure (HTTPS) representational state transfer (REST) API interface. The REST API interface may be used for receiving and pushing data within the platform. (In an exemplary embodiment, these APIs may be made available in a form that enables the customer to integrate them into other platforms in order to enhance compatibility between the present platform and other software platforms, such as may be desired.)

In an exemplary embodiment, the web UI may also be connected to the backend. The web UI may allow users to manually submit data, which may in some exemplary embodiments be combined with the other data collected automatically by the platform or which has been previously collected manually. In an exemplary embodiment, data may be downloaded from various registers and reports available in the web UI. For example, according to an exemplary embodiment, a set of documents, a screen capture (for example, from an airgapped system), and/or a list may be manually collected and submitted by the user via the web UI. Some of the data submitted in this fashion may represent, for example, raw user account information data, security configurations data and application or process specific information, all of which may be submitted through such a process, if desired. This may ensure that the user can manually submit any data that they wish to manually submit, or, if the automation of a particular type of data collection is not possible or is not practical, submission of the results of that type of data collection may be performed manually. The submitted data may also include any other information that may be of relevance to the auditing platform or which may have to be specifically prepared for the benefit of the auditing platform. One example of this may be organization hierarchy data, which may be used by the platform to determine a level of authority that each user should have, for purposes of performing a review of access. (For example, it may be contemplated that an IT manager who is promoted to a more senior management role in which they do not perform any direct IT duties may not need administrator access to some of the systems which he had required administrator access to in his previous role.) Another example of information which may, in some exemplary embodiments, be offline or may have to be specifically interpreted for the platform may be data relating to error messages for security controls, which may be related to events that were not handled properly by the company IT systems and which as a result may need additional interpretation by a user (in order to determine, for example, what failed and why). A third example of such information may be, for example, new user forms data, which may relate to users that have not yet been incorporated into a company IT system. Any other such information may also be contemplated. Multiple types of data may be submitted, such as connector information, manual file uploads and unstructured data sources.

In an exemplary embodiment, the tested and analyzed data may be displayed on a web-style UI, which may allow users to view and interpret the data. In an exemplary embodiment, the submission of data through the web UI may be made via a hypertext transfer protocol secure (HTTPS) web portal. The HTTPS web portal may connect to the backend through a HTTPS REST API interface.

According to an exemplary embodiment, access to the data via the interface may be secured by one or more security measures, such as multi-factor authentication security. For example, multi-factor authentication may be used to authenticate the user when connecting to the backend through the HTTPS REST API interface, such that the user must log in and be authenticated by this process in order to submit and view data. Multi-factor authentication may be provided in two parts, first to check that the user is who they say the user is ("AuthN"), and secondly to ensure that the user can access only what they are allowed to access ("AuthZ"). (In some exemplary embodiments, it may be contemplated to give a user a variable level of access, such as temporary access to certain data, if desired; in some exemplary embodiments, this control may be performed via the multi-factor authentication step.) The web UI may then form a web interface which uses certificates and session keys to encrypt the web interface traffic. For example, in an exemplary embodiment, the web UI may be encrypted using SHA256RSA certificates and may require users to uniquely authenticate themselves in order to gain access to the system.

According to an exemplary embodiment, the collection system may be configured to specifically target and collect data relating to the IT environment based on the connectors the administrator selects, downloads and implements, which may then be combined with the data being submitted manually by the user. This data may then be stored in the backend, and may be tested and analyzed by a testing and analyzing system which may be integrated with the backend.

In order to secure the interface from the connector to the backend, according to an exemplary embodiment, the interface from a connector to the backend may be secured using HTTPS to a REST API using a three-way, limited period session key to encrypt data. The connectors may require the user to first authenticate to the backend and provide a uniquely auto-generated application key. Thereafter tokens may be used for the backend to communicate to the data and services in the backend and the web UI. The tokens are periodically renewed.

In an exemplary embodiment, the REST API key may be generated by the platform and may only be updated through the web UI. Login credentials and multi-factor authentication may be required by the administrator to access the API key.

In an exemplary embodiment, the interface between the user, who may, for example, be manually submitting data and/or viewing analyzed data, and the backend may be secured via the HTTPS web portal. Multi-factor authentication may be required to access the web portal using an authentication application of the user's choice.

The platform may manage user activity through a profile system. As such, when the user first accesses the platform, or prior to the user attempting to access the platform, a user profile may be created by the user. Upon user profile creation, an email address may be required for the user. Upon login, an email may be sent to the user with a unique authentication code, which may be required to prompt the setup of the multi-factor authentication process. In an exemplary embodiment, the multi-factor authentication process may be governed by an external application, and the user may be presented with a quick response (QR) code and backup codes to link to an authentication application of the user's choice. Alternatively, the user may be able to set up multi-factor authentication directly in the platform, which may be any form of multi-factor authentication such as biometric authentication, dongle- or security key-based authentication, and so forth. In an exemplary embodiment, each user session may require the multi-factor authentication procedure to be executed in order to log in. (In some exemplary embodiments, multiple simultaneous forms of multi-factor authentication may be associated with a user, such as biometric data and a unique security key, or an email address and a phone number. In some instances, the user may be able to choose a desired second form of authentication from a set of several forms, such as may be desired; for example, the user may select whether to validate via email or via phone.)

Once authenticated, access to data may then be controlled through user profiles and mapping those user profiles to company hierarchies. According to an exemplary embodiment, user profiled may be linked to a company hierarchy after creation, based on an appropriate linking mechanism. For example, in one exemplary embodiment, a linking mechanism may include a set of unique codes which may be shared by the user profile and the company hierarchy page, which may link the user to the company hierarchy when the user and the administrator managing the company hierarchy each accept each other's codes.

According to an exemplary embodiment, all data may be uniquely tagged, and the platform may control users' access to data so that data with particular tags is only accessible to particular users, such that users may only access data which they have consent or authorization to access. In an exemplary embodiment, access to data may be allowed only through backend APIs, which may enhance the security surrounding the data. In an exemplary embodiment, upon being uploaded, all data that enters the platform may be tagged with a unique code. All communication within the platform may make use of the APIs, which may require a unique identification and authentication to operate, which ensures access to user or company specific data is highly restricted and secured.

According to an exemplary embodiment, linking may be performed between other entities, such as between a first company and a second company. For example, companies that form part of a multiple-entity group (such as parent and subsidiary) may be linked together on the platform. For example, linking may be done by means of a parent company providing a unique code to a child company, who then requests access from the parent company using this code; the child company may only be linked once the parent company accepts the request for access. The parent or child company, or other linked companies, may deny or de-link the other company from the platform at any time, ensuring that the platform does not have to be reconfigured if the subsidiary is spun off as an independent entity. The ability to link and de-link these or other connections may be restricted to the administrators. (For example, an internal hierarchy may likewise be de-linked by an administrator.)

According to an exemplary embodiment, the data collected about the company (or other entity) may be provided to the entity in a detailed form. The data may be organized through a data normalization process, and may be sanitized or anonymized into a global data structure, such that the data is no longer identifiable as having been provided by a specific entity, for various reporting requirements across industries and geographies.

The data collected by the connectors and transmitted to the backend may be processed and stored by the backend. The data submitted using the web UI may also be processed and stored by the backend. The data may be tested and analyzed by the testing and analyzing system integrated with the backend.

In an exemplary embodiment, access configuration may also be included in the backend. Access configuration may include, for example, configuration of core functions of the platform, information output, and user administration.

In an exemplary embodiment, the testing and analyzing system may be configured to apply audit techniques to the collected data using cognitive automation. Cognitive automation is a process by which AI techniques may be applied to automate specific business processes, in a manner that seeks to emulate the overall way that humans think, and which incorporates other techniques such as natural language processing, pattern recognition, and contextual analyses in order to do so.

Cognitive automation may offer certain advantages in that it may learn, at least in some small way, by association. In particular, cognitive automation may allow a platform to take unstructured data, and then use that to build relationships and create indices, tags, annotations, and other meta data. The platform may try to find similarities between items pertaining to specific business processes, such as assets used in each process. For example, upon facing a problem, the cognitive automation system may determine whether the problem resembles something it has seen before, and, if it does find an analogous case, may determine what was done in that similar instance. If not, the platform may determine whether it is connected to something that it has seen before, and, if so, may gauge the apparent strength of the connection. The platform may then drill down deeper, identifying the components involved in the problem.

This may, essentially, provide the platform with something like cognitive ability, which may be improved as the platform makes more and more connections between situations and processes. As a result, the more data the platform consumes, the more intelligent and predictive the platform becomes. Audit techniques can then be used to verify the data collected. Cognitive automation may include one or more of configured rules, machine learning, natural language processing and artificial intelligence.

The testing and analyzing system may be configured to detect unauthorized software being used in the IT environment of the companies, to monitor vulnerability of the IT environment, to monitor backups (and perform any other resilience monitoring and testing, as appropriate, such as testing backups performed to identify failed backups), as well as monitor patch management to identify software that requires remediation and updates to the current installed version. The audit techniques may be simultaneously executed, continuous and carried out in near real-time, allowing for automated and near real-time IT audit services. The testing and analyzing system may be configured to moderate consistent audit quality which is aligned to best practice standards or company policy. The testing and analyzing system may include focused security modules which conduct vulnerability scanning as one component of testing and analysis.

According to an exemplary embodiment, the present platform may be configured to add identifying information to collected data, such that information may be identified as belonging to a particular system type. Likewise, the present platform may be configured to add a layer of context to collected data, identifying the significance of the data or the applicability of the data to specific other systems. In an exemplary embodiment, collected data may be provided with this layer of context prior to testing, allowing the test to be performed with this context in mind. According to an exemplary embodiment, collected data may be provided with this layer of context at any time prior to the conclusion of testing, such that results may be clearly associated with a particular system. This may allow the platform to run audit evaluations once on a particular system, or particular subset of system components, and then later rerun an identical evaluation on a different system. The results of these analyses may then be presented to the user simultaneously. This may, for example, be used to audit portions of an IT system taken alone or with only select other components of the system being included, allowing certain specific faults to be identified and allowing recommendations to be tailored to the actual effect that certain components have on the network. (For example, in one hypothetical case, a network may be tested with a certain component being represented as present, and then may be tested with the certain component being represented as absent. If there is a marked difference in the magnitude or type of vulnerabilities present in the two networks, this may be used as the basis for recommendations to the user. For example, a certain network component may not present a significant risk to the network if attacked, but may function as a plant or foothold for further pivoting inside of the network, and as such the removal of this component from the IT system may result in a larger than expected increase in security.)

Once collected, the data audited by the platform may be reviewed, and, if desired, may be overridden. In certain exemplary embodiments, the data audited by the platform may be selectively overridden, or may be overridden if manually uploaded data dealing with similar aspects of the IT infrastructure is too different from the automatically collected data.

An exemplary embodiment of how the present platform may operate to provide context to data in order to yield an enhanced result is as follows. The platform may be configured to correlate a record pertaining to a human user in one application to an unlinked record for the same human user in a different application, thereby creating a single persistent record for that user across each of the applications that the human user is using, or at least the applications that the human user is using that are interrelated. In various exemplary embodiments of the present platform, it may be contemplated to have the platform conduct further analysis in order to link such records, and the platform may, for example, look at simultaneously active sessions on the same machine in order to link records. (For example, in one such case, a user may have a first record maintained in a first program based on their company email address, which may for example be "john.smith1," and may have a second record maintained in a second program based on a different credential, such as "jsmith," which the platform may not be able to immediately associate with one another based on analysis of records. However, if the user consistently simultaneously updates each record, these two records may be associated with one another, if desired.) In this manner, the platform may thus create a single unique record that provides a view of all of the applications that the human user has access to, even if there is no link between the applications.

It may further be contemplated that the platform may analyze similar data, or contextually linked data, from multiple perspectives, or may apply different sets of rules or machine learning to different sets of data within a grouping of data that has been collected and aggregated. This may allow different control testing contextualization of the information and may show different results that need to be remediated. It may also be possible to apply the same rule multiple times if different results can potentially be obtained. For example, in one case where a control testing result that may be shown on a dashboard of a user may be yielded from statistical sampling of a certain type of data, it may be contemplated to perform statistical sampling of the data multiple times in order to determine a sampling variation.

One further example of how data may be contextualized according to an exemplary embodiment of the present platform may come from a password configuration process. In an exemplary embodiment, elements of the password configuration process, such as a password configuration dialog as it may be implemented on a specific application, may be uploaded to a platform in the form of an image, such as a JPEG or PNG image. (It may also be contemplated to look at other elements, such as the passwords themselves, or password hashes corresponding to commonly used passwords such as "password" or "password123.") This may be analyzed by the platform via machine learning in order to translate the unstructured data to structured data, at which point any algorithms that are applicable to the structured data may be run. The context added to the data set in question may be provided by comparing the now structured data to another set of unstructured data, such as a password policy that has been provided in a PDF document instituted by the organization. The platform may be configured to alert users when the configuration differs from the formally approved policy, when the password dialog in some way differs from the policy (at which point a design team of the software, for example, may be notified) or when the password in some way differs from the policy (if the password is not long enough, if the password hash corresponds to a common password hash, if the password is briefly stored in plaintext and directly analyzed for compliance with a particular standard such as a number of numbers or other special characters that may be required, and so forth). In an exemplary embodiment, different users may be alerted when a breach in policy is noted, based on the nature of the breach in policy and those considered to be responsible for fixing it; for example, when the user has typed an ineligible password, the user may be notified, but when a password dialog itself is vague and ambiguous, an interface management team may be notified.

In an exemplary embodiment, the data audited by the platform may provide percentage confidence levels. The testing and analyzing system may be configured to query and analyze large amounts of data. The testing and analyzing system may be configured to read policies and print screens, compute data, automate routine tasks and test controls.

In an exemplary embodiment, the testing and analyzing system of the backend may include a clustering system, a streaming system, and a data warehouse. The clustering system may be, for example, a cluster of servers set up using APACHE SOLR CLUSTER (or another similar system) to perform clustering or cluster analysis. SOLR, specifically, may allow a user to set up a cluster of SOLR servers that combines fault tolerance and high availability, in a manner that allows the resulting SOLRCLOUD to provide distributed indexing and search capabilities.

The connectors may then be connected to the streaming system, which may, for example, be a system such as CLOUD PUB/SUB, or another similar system. GOOGLE CLOUD PUB/SUB is a fully-managed real-time messaging service that allows messages to be sent and received between independent applications, thereby providing a system which provides a simple, scalable foundation for stream analytics and event-driven computing systems, or other systems that require messaging between different applications. This may allow for stream analytics and event-driven computing which allows for the delivery of event data. The streaming system is connected to the data warehouse or warehouses, such as BIGQUERY and SOLR, which may analyze and store the data.

The testing and analyzing system may further include a machine learning service, such as GOOGLE CLOUD MACHINE LEARNING. The machine learning service may also include a classification system which classifies images into categories, detects objects and faces within images, and also locates and reads printed words within images. The classification system may include a GOOGLE CLOUD VISION application programming interface (API). The machine learning service may further include an audio to text converter system, such as GOOGLE CLOUD SPEECH-TO-TEXT API. The machine learning service may further include a translator for translating text, which may be, for example, GOOGLE CLOUD TRANSLATION API. The machine learning service may further include a reader program which extracts information from text documents, which may be, for example, GOOGLE CLOUD NATURAL LANGUAGE API.

According to an exemplary embodiment, the platform may further include a reporting program. The reporting program may provide real-time and interactive dashboard reporting to report the analyzed information and the data collected, tested and analyzed. The reporting program may be configured to aggregate and consolidate audit results and IT data.

According to an exemplary embodiment, the aggregation and consolidation of the audit results and IT data may involve a data enrichment process, which may then be made available to the user via the reporting program. Based on the enriched data, various visualizations may be generated for the user in order to show the data as visual results. For example, according to an exemplary embodiment, data in an audit report may be enriched by adding a comparison of the organization's results relative to other organizations of a similar size or complexity, or in a similar industry, which may be performed individually or in aggregate (i.e. an average result for companies of similar size, an average result for companies of similar complexity, and an average result for companies in the same industry, or alternatively a grouping of two or more of the above such as data for the nearest available peer or set of peers). It may also be contemplated to enrich the results by taking into account previous data records from the company, such as a previous year's data records, an average of several previous years, or a forecasted trend, which may for example be based on a set of previous years or a set of data collected over other time periods. For example, it may be contemplated that audits may be performed multiple times within a year, such as monthly, and the results of an audit may be compared to a data set determined based on a trend forecasted based on the monthly results in order to indicate improvement or worsening of the IT control environment in response to changes made by the company, new developments in external threats, and so forth.

Reporting functionalities of the reporting program may include drill-down capabilities, which may allow the user to click and view or interrogate the source data that resulted in a specific outcome. For example, according to an exemplary embodiment, a visualization of data presented to the user may be provided in such a manner that specific elements of the visualization are associated with specific data elements, allowing the source data to be directly retrieved upon selection of a particular element of the visualization.

According to an exemplary embodiment, the reporting functionalities of the present platform may be used to equip different audiences with visibility into one or more of governance, risk, maturity and security of the IT environment. The views may be customized for a particular audience, by tailoring the presentation of the views to present more or less detail regarding governance, risk, maturity, or security. Reports may be generated using the reporting system. The reports may include free-text options. A single view of the user across the IT environment may be provided with the associated risks and maturities. The reporting system may be configured to allow for reports to be exported and downloaded by the user, or otherwise made available or published, if desired.

The reporting system may be configured to accommodate multiple reporting lines, both functionally and operationally. The platform may, as a general matter, be targeted primarily at two types of audiences. A first intended audience of the platform may include those users charged with governance of an IT environment, as the platform equips the users with visibility into the risk, governance and security of the IT environment. The second intended audience of the platform may be IT management, as the platform enables IT management to mitigate and manage the IT risks in a continuous, online and real-time manner.

In an exemplary embodiment, visualization of the results of the audit services provided by the platform may be customizable to the target audience through real-time and interactive dashboards with both aggregated overviews and drill-down capabilities, which may include, for example, an instant messaging platform. These mechanisms, respectively, may be configured to alert audiences of new threats and/or anomalies detected and facilitate questions and answers about the IT environments.

The platform may further be configured to retrieve and store information regarding the latest technologies available and their estimated price points, including the costs associated with purchasing whatever IT infrastructure systems are necessary to purchase, or an appropriate license to same (which may, for example, be calculated by the platform based on anticipated need), and the costs associated with implementation. The platform may then be configured to generate a proposal for the user specifying the latest technologies available, and comparing them with existing technologies, which may also provide indications of cost savings and/or price differentials. The platform may generate a requirements document for a future state of optimization. These features may form part of the reporting system.

According to an exemplary embodiment, the platform may be further configured to provide remediation alerts and notifications in order to remediate the data collected, tested and analyzed. The alerts and notifications may be based on continuous monitoring conducted by the platform. The platform may be configured to detect global anomalies, establish trends in those anomalies, and then respond to the anomalies. The platform may have an extensive database of real-time data that allows for industry, company and/or user profiling for both trending and anomaly detection purposes. The platform may also include filtered alert mechanisms.

The platform may be configured to provide remediation recommendations through the reporting system. For example, in an exemplary embodiment, the platform may identify a particular user that presents a high risk in the current user configuration, and may identify this user as a high risk. (For example, as discussed to some extent above, it may identify that a user in a senior management role has certain IT or network security credentials which they no longer need because of their new role. The platform may then generate a recommendation for the user that this senior management figure should be removed from certain systems or granted a lower level of access.) In an exemplary embodiment, all of these recommendations may be consolidated on a single view, such that all of the recommendations may be reviewed and enacted, or not enacted (if desired), at once. This may provide an improvement over existing tools that require IT management personnel to review individual users, or other individual issues, on an application-by-application view, sometimes even requiring that different tools be used in order to review successive issues.

In an exemplary embodiment, the remediation recommendations may be customized to suite the user's needs based on factors such as measurable metrics, the best product fit for the user, and benchmarking available to compare solutions to one another. (For example, ideally, the user may be shown a product comparison showing a current product, a best product, metrics for each product showing a degree of improvement that could be obtained by selecting the other product, and benchmarking showing the capabilities of each product.) The platform may be configured to alert or notify the user of current risk exposures or inefficiencies within the IT environment. The platform may be configured to map the existing specifications of the user's IT environment to a proposed specification based on product catalogues and/or rules and architecture intelligence.

The platform may function to make business-specific recommendations, which may include a recommendation to take no action or take incomplete action to resolve an issue if it is considered to present a low level of harm or is otherwise considered to be a low priority. For example, in one case, if the platform detects a security issue in the IT environment, it may then operate to make recommendations regarding the remediation of the security issue in the context of the size of the environment, the risk appetite of the business, the risk profile of the business, the budget of the business, and so forth. This may operate to provide a contextualized and non-generic method of providing an audit recommendation, allowing the overall platform to make highly specific remedial recommendations that may involve recommendations of specific tools, or which may incorporate the "how" and "why" of solving the problem. In an exemplary embodiment, such recommendations may be based on training data regarding the history of the business or other organization, the history of other businesses in its industry, or any other applicable information such as threat forecasting, such as may be desired.

To give an example of how this may function, the platform may determine that a particular security issue exists for a business, in a first step. The platform may then determine a size of the business environment, and evaluate the other risks presented by the business environment, and their estimated impact on the business environment as a whole. The platform may then determine a risk appetite of the business, which may be based on, for example, customer specification of a risk appetite value, evaluation of past responses to attacks, or comparison to other similarly-situated businesses in its field or in related fields. The platform may then determine a risk profile of the business, in order to evaluate the predicted frequency and severity of future attacks, as well as the nature that these attacks are likely to take, which may again be based on past results or based on a comparison of the business to the remainder of its industry. The platform may then determine a budget of the business, and, using the specified budget of the business, price information regarding a set of tools, and the estimated impact of each tool, may perform an optimization step in order to determine which tools would have the most overall impact on the business's security issue or security issues.

In an exemplary embodiment, the platform may maintain a list of basic security controls which can be implemented with little or no cost, which may have a significant overall impact on the typical cybersecurity exposure for a business. For example, if the organization has a large budget and a limited number of security issues, the platform may recommend a number of powerful proprietary tools tailored to that specific problem, whereas if the organization has a small budget and a larger number of security issues, the platform may first try to select freeware tools that might have the biggest impact, and may then perform an optimization step regarding the remaining issues, choosing tools that are likely to cost-efficiently reduce the severity of the biggest issues. (It is noted that the use of even basic cybersecurity controls can help reduce overall exposure by up to 85%, for almost any company. These baseline controls may include, for example, tracking of IT hardware and software over time, the appropriateness of password controls on the network and on local machines, whether appropriate logs and monitoring are operating, whether antivirus has been properly deployed, whether software patches have been properly installed, whether there are any software or configuration vulnerabilities in the IT environment, and whether the user and administrator accounts on the network have been properly configured.)

According to an exemplary embodiment, once a recommended tool or service has been implemented, further actions may be taken in order to interact with the tool or service in the context of an exemplary embodiment of the platform. For example, according to an exemplary embodiment, following the implementation of a recommended tool or service, a business operating a platform may be able to provide a rating based on the ease of implementation of the tool or service, or may alternatively be able to provide other feedback through an interface provided via the platform. In an exemplary embodiment, this may be used in order to improve future recommendations involving the type of issue that the business has encountered and the applicable remediation plan, which may, for example, be applicable to every occurrence of such issue or may, for example, be applicable to every future occurrence of the issue that involves a business in the same industry, of the same size, having the same internal complexity, or so forth. For example, in an exemplary embodiment, a tool with the highest rating or the highest rating by similarly-situated businesses may be automatically recommended, or a set of top three tools may be automatically recommended, which may be based on lifetime feedback and user ratings or may be based on limited-time feedback and user ratings, such as feedback corresponding to the last several versions of the tool or which has been taken over the past year or another such time period.

According to an exemplary embodiment, the platform may store, for each company which is part of a group, a profile, the profile being managed by an administrator of that company or another authorized user. The backend may also store an inventory of hardware and software used by each company of the group.

In an exemplary embodiment, all system activities may be logged by the backend. The logging may include, for example, a process of timestamping and referencing the associated user or connector. In an exemplary embodiment, all internal communication within the platform may be logged and retained in the backend. (In some cases, where internal logging is not available for particular communication but other records of the communication exist, the platform may be configured to prepare a written request to a designated person, requesting the communication.) In an exemplary embodiment, the set of new users and last logins may be tracked and may be provided to the administrator on an interface, allowing the administrator to track this information. In an exemplary embodiment, all evaluations and amendments to control evaluations may be associated with, and may show, last updates and reviews. Further logging may be made available through the APIs available for each system. By using the system APIs and a business intelligence tool of choice, the administrator may create their own system management dashboards.

According to an exemplary embodiment, the platform may be configured to operate with an extensive, global set of real-time data to perform trending and profiling of IT risk and/or maturity based on company or group type or industry. The platform may automatically apply risk monitoring against the companies or groups using the platform when a new global trend and/or anomaly is identified by the platform, and the platform may then be configured to automatically alert relevant users or stakeholders of the companies or groups accordingly.

According to an exemplary embodiment, the platform may, in this manner, be configured to provide insight of the user's current IT environment relating to the IT environments infrastructure. The platform may be configured to provide an auditing service and act as a management monitoring tool or system.

The platform includes IT Auditing over a variety of information technology features, and encompassing a variety of programs. This may include, for example, IT Auditing of technical security features such as antivirus, firewalls, asset management, network security configuration, password configuration, patch management, user profile management, website security, WordPress specific security. This may further include IT auditing over Microsoft structured query language (SQL) security measures such as SQL server hardening. (According to an exemplary embodiment, SQL hardening may provide automated testing of a variety of critical areas of SQL database security, including version management, authentication mechanisms, backup management, antivirus deployment, and required services testing.) This may further include IT auditing over cloud security features such as generic security measures that are core to the configuration of any cloud environment and AZURE-specific security measures. This may further include IT auditing over business resilience features such as back-up management, back-up operations, business continuity planning and disaster recovery planning. This may further include IT auditing over user administration features such as new and terminated user profile management, user access policies and procedures, user data profile data accuracy and user profile management.

It may further be contemplated to have the platform act as a pre-sales tool enabling a sales force to sell intelligently. In such an exemplary embodiment, the platform may be used to pre-scan an IT environment and generate certain specified output information for a vendor, who may then use this valuable information to determine how to best pitch their solution and make the correct proposal to a customer. As such, the platform may substantially digitalize the sales force by taking the previously human intensive process of performing an IT audit and completely automating the process from start to end, and then further applying the audit and recommendation process in order to generate recommendations of which specified products (such as products sold by the vendor) could improve the operation of the IT system. In some cases, such as when the platform operator does not necessarily want to expose their entire system to analysis (for example, if the vendor is a prospective vendor with no pre-existing relationship with the company), the IT audit platform may also be configured to fill in blanks or make conjectures based on the best available information.

In an exemplary embodiment, the platform may assist with cloud-readiness assessments and environment optimization by providing insight into the current architecture, operational information, and seemingly unrelated systems. This insight could be used to re-architecture the environment on a cloud platform, as a more efficient or effective local platform, or a hybrid of cloud systems and local, on-premise systems.

In some exemplary embodiments, variations on the platform described above may be contemplated. For example, according to another exemplary embodiment, there may be provided a method of facilitating the automated IT audit using the platform described above. This method may include the steps of collecting data from one or more sources using a collection system; testing and analyzing the data gathered by the collection system using the testing and analyzing system associated with the backend; and reporting the tested and analyzed data to the user through the reporting system and presenting the tested and analyzed data on the frontend such that the tested and analyzed data is accessible and manageable by the user.

According to such a method, the platform may further use the data collected, tested and analyzed to generate a textual report detailing the analysis, and may further be configured to make remediation recommendations based on the results.

According to another exemplary embodiment, there may be provided a system for facilitating an automated IT audit, similar to the one originally described, which as noted may make extensive use of an automated IT auditing platform. This platform may include a frontend configured to allow one or more users to access and manage the platform; a network connecting the frontend to a backend; and a collection system configured to gather data from one or more sources in an IT environment to be used for the IT audit. The backend may include at least one server configured to send, receive, store and process data, and a testing and analyzing system, which may encompass algorithms, machine learning and artificial intelligence, the testing and analyzing system being configured to test and analyze the data gathered by the collection platform against pre-configured best practice standards and/or policies; and a reporting system configured to transmit the tested and analyzed data to the frontend, wherein this data is presented on the frontend for the one or more users to access and manage.

Such platforms may allow an IT audit to be conducted without requiring human effort or involvement, and may provide audit-as-a-service which avails IT security assurance on any IT environment, irrespective of the size, complexity, posture or maturity of the IT environment, effectively allowing for demonetization and democratization of the IT auditing process, and thus serving to better promote data security. The platforms may perform IT audits of the IT environment against specific standards, and may analyze process maturity, as well as analyze physical documents and/or written policies, this being achieved by obtaining data from various sources. Cognitive automation, rule configuration analysis, machine learning and artificial intelligence may be used by the platform to interpret the data and translate the results for auditors and their stakeholders to understand context and risk within the standards that the results are measured against, and in this way the platform may be configured to opine on the data which is extracted as well as other data which is manually submitted, by generating not only summaries but recommendations, such that the platform audits the IT environment automatically.

An exemplary embodiment of the recommendation process may be provided as follows. In a first step, the platform may assess the data set against pre-defined industry standards. In the absence of pre-defined standards for the particular industry in which the company that is being audited falls into, or in the event that the company is at the junction of multiple industries and standards are otherwise not clearly defined, or in the event that the company has defined its own best practices or more rigorous requirements that are more stringent than the industry standard or which are deliberately weaker than the industry standard based on some other criteria (such as, for example, a need to maintain legacy systems which do not otherwise support best practices). these standards may be substituted instead. (In some cases, where a company has defined its own best practices and best practices are clearly defined for the industry in which the company participates or are clearly defined for comparable companies, multiple standards may be provided, such as the company's own defined standards and the prevailing standards.)

In a second step, the platform may measure the client data against the requirements defined by their own standards or the industry standards, and determine the absence or presence of an audit finding based on predefined logic and rules, as well as machine learning algorithms. The absence of a finding may serve as a first metric in determining a risk and a maturity level of the organization. Other metrics, such as the quantitative nature of the risk that the audit finding identified, the qualitative nature of the risk that the audit finding identified, the size of the organization's environment, the inherent risk of the industry that the organization operates in or any other risk-relevant criteria such as the inherent risk of the geographical area that the organization operates in or does business in, and so forth may also be evaluated. According to an exemplary embodiment, some of this information, such as the information regarding the organization's size, may be supplied directly to the platform or may be assumed based on data collected during scans. For example, the industry that the organization operates in may be supplied during setup.

In a third step, once results are generated, industry benchmarking can be applied, and the company may be presented with recommendations, including, for example, recommendations for high-end performance and recommendations for cost-effective alternatives.

Various exemplary embodiments of the overall system, or the individual platform or platforms, or methods for their use or software for implementing same, may thus be described in brief as follows. In a first exemplary embodiment, a method for performing an information technology audit using an automated platform may be described, which may include the following steps. A first step may include creating, via a user interface, a connector having a connector type, such as, for example, being a "canary connector," and then defining, via the user interface, a configuration for the connector based on the connector type, which may potentially include editing the connector or otherwise assigning nonstandard behavior to it. This configuration may be stored as a stored configuration in the automated platform In following steps, one or more credentials may be assigned to the connector, and the automated platform may operate to validate the credentials. Following a validation of the credentials, the stored configuration may be retrieved from where it is stored in the automated platform, and a connector configuration may be synchronized between the connector and the stored configuration in order to ensure that each has the most current configuration. The system may then collect, from a data source and via the connector, a set of client data, and provide a data output to an application programming interface (API) and services platform based on the set of client data. During this process or following it, at least one data interpretation step may be executed on the API and services platform, with the at least one data interpretation step including passing the data output to at least one skills API, and performing, with the at least one skills API, digital interpretation of unstructured data provided in the data output.

The method may further include the step of executing, on a processing platform coupled to the API and service platform, at least one controls evaluation step, with this step including determination of a control output based on a result of the at least one data interpretation step, and further storing a result on the processing platform. This may include, for example, tests and analysis of data in order to determine compliance with controls guidelines or requirements.

The method may further include generating and updating a plurality of dashboards based on the result, a first dashboard being a summary dashboard including a plurality of graphical displays, each of the graphical displays corresponding to one or more control results, and a second dashboard being a monitoring dashboard including at least one currently actionable item identified by the processing platform. Further, the method may include generating and outputting at least one recommendation to the user for remediation of the at least one actionable item based on at least one comparison of a remediation solution to an alternative solution by the processing platform.

The step of generating and outputting the at least one recommendation may include steps of selecting the remediation solution from a list of available remediation solutions based on constraints provided by the user; conducting a first test of a network component with the remediation solution simulated as being in place; conducting a second test of a network component with the alternative solution simulated as being in place, and comparing a result of the first test and a result of the second test. One example set of constraints provided by the user would be a remediation budget, and the method may include determining a price of the remediation solution and determining an estimated efficacy of the remediation solution. For example, the system may optimize a plurality of recommended remediation solutions based on the price of each recommended remediation solution in the plurality of recommended remediation solutions and an estimated efficacy of each recommended remediation solution in the plurality of recommended remediation solutions. Other constraints might include, for example, a minimum rating that has been provided by other users; each remediation solution may be associated with a rating score, made up of at least one rating of one or more other users.

The step of executing, on a processing platform coupled to the API and service platform, at least one controls evaluation step may include transmitting data from the API and service platform to the processing platform via a hypertext transfer protocol secure (HTTPS) representational state transfer (REST) API.

An example of unstructured data that may be fed into the system may be, for example, an image (such as JPG, PDF, PNG, etc.) of a password policy or an image of a password creation screen.

In the above-described method, many of the steps may be performed simultaneously or contemporaneously, such that part of a preceding step continues after a following step is executed. For example, in an exemplary embodiment, a step of providing the data output to the API and services platform based on the set of client data may be performed contemporaneously with the step of synchronizing the connector configuration between the connector and the stored configuration, such that the step of providing the data output to the API and services platform based on the set of client data is initiated during a synchronization process after the synchronization process has synchronized run-time settings. In another example, each of the steps of collecting, from the data source and via the connector, the set of client data, and providing the data output to the API and services platform based on the set of client data, may be performed contemporaneously, with a first set of data is output to the API and services platform prior to an end to a step of collecting the set of client data.

The step of generating and updating the first dashboard may include comparison to some external standard, and may include, for example, retrieving at least one of an industry standard, a similar-sized company standard, and a similar-complexity company standard, and generating the plurality of graphical displays based on the at least one of the industry standard, the similar-sized company standard, and the similar-complexity company standard. Any or all of the above may function as references for the purposes of comparison on an executive summary dashboard. Likewise, a past data record for the company or a forecast for the company may be used, alone or in combination with any of the above.

Providing a data output to an API and services platform based on the set of client data may make use of a message buffer, and as such this process may involve incorporating the data output into a message buffer, and then, with the API and services platform, consuming the message buffer prior to storage of the data output.

Manual uploading of data, such as CSV files, may also be contemplated, and as such the method may further include steps of receiving, via the user interface, a submission of at least one data file; determining, based on one or more connectors including the connector, a matching connector in the one or more connectors (which may enable the file to be associated with an appropriate connector based on whatever information is available, such as a file extension name if the file is associated only with one type of program output, or other identifying information if the file is in a common format like a text file or CSV file); and automatically assigning the matching connector to the at least one data file, and uploading the at least one data file via the matching connector.

As noted, it may be contemplated to specify certain information for a connector and sync that information across all instances of the connector that are used by multiple instances of the program, if desired. Edits may be made to a connector type; for example, the method may include steps of, via the user interface, selecting the connector type, and performing, via the user interface, an edit to the connector type; and storing the edit to the connector type as the stored configuration in the automated platform prior to the step of creating, via the user interface, the connector having the connector type.

It may be contemplated that an advantage of the present system may be that multiple audit sources may be combinable into one lens automatically, such that, for example, three different systems may be tested for the same audit control, and then a combined set of results may be displayed. For example, according to an exemplary embodiment, a set of uploaded client data may include data corresponding to a plurality of client systems. The step of executing the at least one controls evaluation step may include determining an audit control to be executed, executing the audit control on the data corresponding to each of the plurality of client systems, and obtaining an audit control result for each of the plurality of client systems. The step of generating and updating the plurality of dashboards based on the result may include steps of simultaneously displaying each of the audit control results for each of the plurality of client systems.

The system may be multi-tenanted, and as such it may be contemplated to have the method include simultaneously executing a plurality of information technology audits, each of the plurality of information technology audits being operated in multi-tenanted form on the automated platform.

It may be contemplated to include multi-factor authentication and different levels of access from different users or administrators, and it may be contemplated to, for example, have the user authenticate by combining a credential code with a level of access code. The method may further include the steps of determining, via a multi-factor authentication step, a right of access of the user and a level of access of the user; and limiting the set of client data based on the level of access of the user.

It may also be contemplated to combine user profiles with a separately-managed organizational hierarchy by the use of a code exchange. For example, the set of client data may further include organizational hierarchy information, which may or may not be provided in full to the system. A user profile may be provided in the set of client data and may be identified. A unique code associated with the user profile may be transmitted, and the user linked to the organizational hierarchy via the code.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 3 provides a comparison between an exemplary platform as provided herein and existing competitor solutions;

FIG. 7A depicts another exemplary embodiment of a user interface of the platform showing the dashboards for reporting;

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a platform for facilitating an IT audit may be disclosed.

Figure 1:
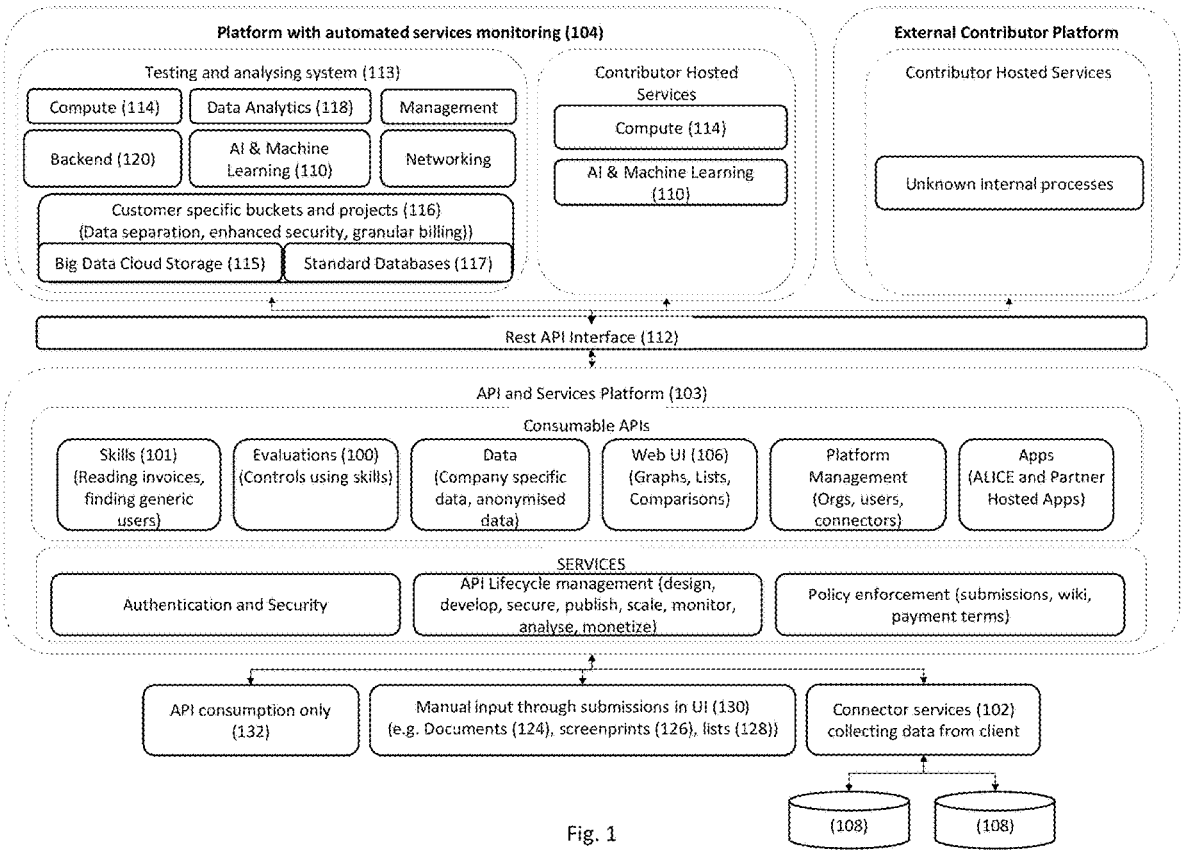
FIG. 1 depicts a flow chart showing the architecture of the platform which illustrates an exemplary method of operating.

Turning now to exemplary FIG. 1, FIG. 1 displays an exemplary flow chart showing the architecture of an exemplary embodiment of the platform, which illustrates an exemplary method by which the platform may operate. The platform may generally be divided into a connector portion 102, which may govern the integration of data from other software tools and platforms into the platform; an API and services platform 103, which governs the access and authentication of users to APIs and services, data routing and transaction monitoring; a platform portion 104, which may handle the requisite processing performed by the platform; and a web UI portion 106, which may display the results to the user.

Looking first at the connector portion 102, source data 108 may be fed into one of a plurality of connectors 102, which may be used to translate the data into an appropriate form. Various connectors 102 may be contemplated for different types of source data, each connector in the set of connectors 102 corresponding to one specific type of data.

According to an exemplary embodiment, the data incorporated into the connector framework 102 may be structured or may be unstructured, or a combination of either, such as may be desired. In an exemplary embodiment, the collection of data through the connectors may be automated, such that the platform may be configured to interpret a data set, determine what connector would be appropriate for the data set in question, and upload the data via the appropriate connector. (This may be based on, for example, recognizing electronic data as being the output of a particular program based on its filetype or based on identifiers in the data, and selecting the connector corresponding to that program.)

According to an exemplary embodiment, a connector framework 102, or any other part of a connector structure 102, may be secured based on a unique login or unique set of credentials by an administrator, such as an administrator of a registered organization. In an exemplary embodiment, these credentials may be created at setup and stored locally, being retained in the client environment in an encrypted format, along with any other setup or network credentials. This may ensure that control over the platform is retained by the client administrator.

According to an exemplary embodiment, each of the connectors in the connector framework 102 may connect to a platform 104 through an API and services platform 103 and HTTPS REST API interface 112 or other API interface, with this platform including a backend, analysis, and data storage, such as may be desired. (In an exemplary embodiment, the platform 104 may be a cloud-based platform, with each of the backend 120, the analysis features 118, and the data storage features such as, for example big data cloud storage 115, customer specific buckets and projects 116 and standard databases 117 being provided as services or created as custom services. This may allow for certain advantages, such as the use of platform security services, to be realized. For example, in an exemplary embodiment, the use of the platform 104 to provide all of the underlying infrastructure may ensure that the service is operated wholly by a trusted party and can be installed by an outside IT organization without the IT organization having any underlying access to the data. In other exemplary embodiments, another cloud-based system, a local system, or a hybrid system may be contemplated.) In an exemplary embodiment, this interface 112, operating in concert with the API and services platform 103, may use certificates to encrypt the traffic between the connector framework 102 and the platform 104.

According to an exemplary embodiment, the platform 104 may include a backend. The configuration of the platform 104 and any other components of the system may be managed in the backend 120. The platform may also provide data analysis 118 and data storage 116 as well as data processing 114. In particular, data may be received from the HTTPS REST API interface 112 by a data processing component 114, with connector feedback also being passed along with the data. The output of the data processing component 114 may then be stored in data storage 116, and data analysis may then be conducted on the stored data in the data storage component 116 once all data has been appropriately processed, formatted, and stored. (The output of the data analysis component 118 may also be stored in the data storage component 116.)

The output of the data analysis component 118 may also be provided to the backend 120 as part of a configuration step, as part of an overall process of managing the configuration in the backend. This may include, for example, access configuration, a step which may be performed in the backend 120 in order to provide configuration of core functions of a platform, information output (such as information that may be extracted via the connectors), and user administration. The functions of the backend 120 may thereby also control how the data analysis 118 step is performed.

The data storage component 116 and the backend component 120 may each be accessed by another API interface, such as another HTTPS REST API interface 122. According to an exemplary embodiment, this HTTPS REST API interface 112 may be accessed by the API interface 132 of the API and services platform 103, or another web user interface 106, through which the user may also upload data. According to an exemplary embodiment, access to this HTTPS REST API interface 112 via the UI 106 and API interface 132 may be secured using multifactor authentication, which may be handled by the backend 120 or by any other component of the platform, such as may be desired. (For example, in an exemplary embodiment, the backend 120 may be configured to generate and send email messages or text messages to a designated email address or phone number of the user in order to verify that the user has access to their email address or phone, ensuring that the user is more likely to have been properly identified.) In an exemplary embodiment, the HTTPS REST API interface 112 and API interface 132 may make use of certificates and session keys to encrypt traffic, such as may be desired.

This UI may allow for the manual submission of data in any compatible form, such as in the form of documents or sets of documents 124, printscreens 126, list 128, and any other data such as may be desired. As such, this may allow for such data or evidence to be manually collected by a user and submitted by the user himself 130. Manual submission is facilitated through the HTTPS web portal 106, which as mentioned may connect to the platform via the HTTPS REST API interface 112 and API interface 132. According to an exemplary embodiment, multi-factor authentication may be used in order to secure the upload interface, such that a secure login with multi-factor authentication may be required by the user in order to submit and view data. In an exemplary embodiment, password security may be handled by the backend system, which may natively validate authentication such as may be required. In an exemplary embodiment, any other hashed password system or any other password system where passwords are not stored in plain text may be contemplated. In an exemplary embodiment, other elements of the login process may be linked to an external platform, such that, for example, the platform manages an active instance of the program upon login. For example, the platform may be updated on a regular schedule, with the updates creating a new instance of the program which may be pushed to users. Upon logging in, the platform may automatically migrate the users to the new branch.

The connectors 102, web UI 106, and platform 104, put together, may form the system for facilitating an automated IT audit, with the platform 104 being configured to interface with the web UI 106 and retrieve data via the connectors 102.

In an exemplary embodiment, the system may be implemented according to a multitenancy approach, whereby multiple independent instances of the system for facilitating an automated IT audit may be run simultaneously in a shared environment, such as a central server or set of cloud servers. This may ensure that multiple audits can be performed at once, by separate organizations or even by separate audit teams that do not necessarily wish to directly disclose information to one another.

It may also be contemplated to have individual components of the platform be relatively isolated from one another, such that certain components are "ring-fenced" from one another, or such that certain components are multitenanted within the same environment. In an exemplary embodiment, the platform may be modular and as such each component may be updated individually, such that multitenanted instances can be customized to the user's needs, such as may be desired. For example, in an exemplary embodiment, the individual connectors 102 used by the platform may be specified individually by the user, and as such the individual connectors 102 may be updated separately. According to an exemplary embodiment of the system, each of the connectors 102 may be managed through an on-premise installer operated by the platform that requires updates from time to time, and which may in some exemplary embodiments be provided with updates on the same schedule as the remainder of the platform. For example, according to an exemplary embodiment, a notification may be provided to a user regarding one of the connectors 102 being eligible for an update. The user may then download an installation binary, install the updated connector, and replace the outdated one. In an exemplary embodiment, the platform may restrict the use of outdated connectors 102 or connectors 102 that are a certain number of updates behind, ensuring that data collected by the connector cannot be uploaded until the connector 102 has been updated. The use of a cloud system for a substantial portion of the backend of the contemplated platform may ease other update processes, and in an exemplary embodiment updates may be made to the cloud software as soon as they become available.

Looking first at the source data components 108, according to an exemplary embodiment, the connectors 102 that may be used to integrate the source data 108 may be a combination of local or "on-premise" connectors, or connectors located in the cloud. In an exemplary embodiment, some or all of the connectors 102 may be virtualized via containers or through services, though other implementations are of course possible.

According to an exemplary embodiment, the connectors 102 may be integrated with the data storage components 116 of the platform through the use of the API and service platform 103 and Rest API interface 112, or any other message integrator 112, such as may be desired. the API and service platform 103 and Rest API interface 112 is a software application that may be used to link the outputs and inputs of many other software applications, in many-to-one, one-to-many, or many-to-many fashion. In the API and service platform 103 and Rest API interface 112, a publisher application, or plurality of publisher applications, may create and send messages to a "topic," which may be managed by the API and service platform 103 and Rest API interface 112 program. Subscriber applications may then create a "subscription" to the topic in order to receive messages from it. In a "one-to-many" use of the application, communications may be directed such that the direct output of the publisher application may be the "topic," which may be "fanned out" to each of the subscriber applications. Likewise, in a "many-to-one" use of the application, communications may be directed such that the publisher applications may each output to different API subscription (or to the same API subscription, if desired) and a subscriber application may subscribe to each of them, "fanning in" the data instead of fanning it out. A "many-to-many" use of the application may essentially be a combination of the two.

To provide an example of how "fanning in" and "fanning out" may each work in this framework, in a "fanning in" case where multiple publishers publish to different API subscriptions which are each subscribed to by the same user, a first publisher P1 and a second publisher P2 may provide, respectively, a first message M1 and a second message M2. The first message may be interpreted by the API and service platform 103 and Rest API interface 112 application as being associated with a API subscription of the first publisher P1, which may be topic A. The second message may be interpreted by the API and service platform 103 and Rest API interface 112 application as being associated with a API subscription of the second publisher P2, which may be API subscription B. A subscriber X may be subscribed to API subscriptions A and B, and, as a result of the publishers' postings, a message for subscription XA and subscription XB may be generated and sent to the subscriber X. In a "fanning out" case, by contrast, only one API subscriptions C may be created from a message M3 of publisher P3, and this API subscriptions may be used to generate messages for the subscription YC of subscriber Y and the subscription ZC of subscriber Z.

The API and services platform 103 may include a messaging framework configured to receive a message associated with a particular publisher application, which may be assigned to the API of that publisher. (Each message may include, for example, a message payload and optional attributes that describe the message's content.) Upon being routed through an API subscription, the data from the message may then be stored in a message store, until delivered and acknowledged by the platform 104. The messages pertaining to the API subscription may be sent to all services linked to that API subscription, the API Interface 112. The subscriber may then receive these messages and send an acknowledgment, which may, when received, remove the message from the platform's queue of messages.

The platform may then pass these messages to subscriber programs, which may perform, for example, the data storage 116 functions of the invention. According to an exemplary embodiment, messages may be passed from the rest API interface 112 to the platform 104 for testing and analysis.

According to an exemplary embodiment, a test and analysis system may include the backend 120 processing, application of machine learning 110, data analysis 118 and data storage 115 and 117. In an exemplary embodiment, a clustering system 117 may be implemented which may be configured to perform clustering or cluster analysis. In an exemplary embodiment, a data warehouse 115 for big data analysis may be configured to analyze and store the data.

In an exemplary embodiment, a backend system 120 may include a cloud integration system, including, for example, a Web framework. The cloud integration system may further include a database system 117, which may in some exemplary embodiments be maintained via a fully-managed database service which enables users to set up, maintain, manage, and administer relational databases that make use of rational database services. The cloud integration system may further include cloud storage 116. The cloud integration system may further include configuration details, which may be managed in the backend and used to control the API and service platform 103.

According to an exemplary embodiment, the testing and analyzing system 113 and the backend system 120 may receive and store the results of data analysis from the analysis components 118 and machine learning services 110. In an exemplary embodiment, the testing and analyzing system 113 and the backend system 120 may each receive the results of different analysis components 118 and machine learning services 114. For example, according to an exemplary embodiment, the testing and analyzing system 113 may be connected to cloud service for running server clusters, which may be used in order to operate the clustering system or perform necessary tasks. This system may allow clusters to be created on demand whereby instead of instantiating a cluster and then assigning jobs to it, users may submit jobs and have the clusters tailored to fit. This provides for more efficient operation overall for most applications, with a small "boot-up tax" of around a minute as the job is submitted and the cluster is created. The backend system 120, on the other hand, may receive the results of jobs which may containerize the elements of a job queue. In an exemplary embodiment, the job queue may be maintained in compute 114. The backend system may further be connected to a data upload systems, such as a machine learning 110 system, which may allow physical documents to be scanned, deciphered, and uploaded to the platform 104 as intelligible data.

The platform 104 may then be connected to a frontend 106 via the API interface 112, which may provide a user interface that allows for user interaction with the platform and system, and may allow for manual uploading of data.

In an exemplary embodiment, the overall platform may provide machine learning services 110, which may be facilitated by a cloud machine learning API, vision API, speech API, translation API and natural language API, and which may be implemented in the platform 104 or the testing and analyzing system 118. The machine learning services 110 may also be made available through the API and services platform 103 as a skill 101 to be used in evaluations 100.

Figure 2:
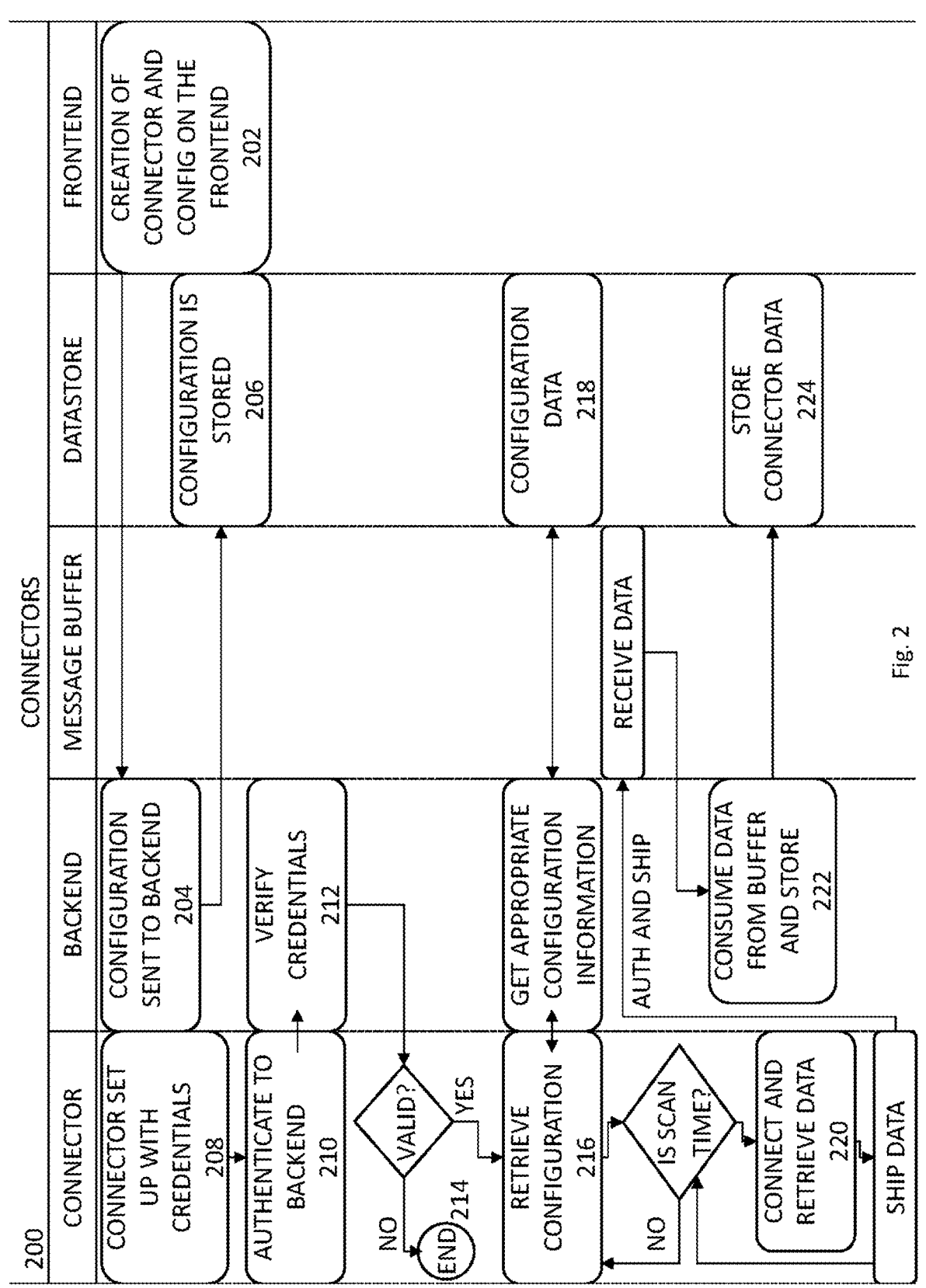
FIG. 2 depicts a further flow chart showing an architecture of an exemplary embodiment of a connector.

Turning now to exemplary FIG. 2, FIG. 2 provides an exemplary embodiment of a data collection mechanism implemented using a connector 200, which may be implemented as one or more of the connector services 102 previously described with regard to FIG. 1. According to an exemplary embodiment, such a data collection mechanism implemented using a connector 200 may function as follows. In a first step, the connector may be created 202, and may be appropriately configured, based on data input from the frontend of the platform, such as a web user interface providing a connector configuration and creation page that allows the capturing of specific setup details. This configuration may then be sent to the backend 204, and may be stored in a datastore 206, which may, for example, be cloud storage.

Once this takes place, or at any other point in the process, the connector may be set up 208, which may include, for example, installing an executable downloaded from the configuration and creation page, or which has otherwise been obtained. (For example, it may be contemplated to have some or all connectors be configured in an original state of the program, or may be contemplated to have users create new connectors based on provided configurations, such as may be desired. As such, it may be contemplated to have a connector be set up immediately after a creation step 202 and prior to a separate configuration step, or may, for example, be contemplated to have a connector be set up with a given configuration.)

The connector may then be configured using unique credentials 208 in order to enable the connector to authenticate with the platform backend. Once the connector is set up 208 with the appropriate credentials, the credentials may be authenticated via the backend 210, by sending them to the backend for verification 212, which may then determine validity. If the credentials are not valid, the process may be terminated 214, such as with an error. Optionally, the platform may be configured to take additional action in such a situation, and may, for example, provide a user output regarding the nature of the error in verification if any user output can be provided. (For example, it may be contemplated that an attempt to pair a connector with a data source may fail because of an improper username, such as a typographical error being provided in the username. The data source may then report that the username does not exist, and this may be passed along to the frontend. It may alternatively be contemplated that further verification of credentials is required than what may be possible for the backend to execute; for example, it may be the case that any access attempt requires two-factor authentication or other authorization, and this may have to be separately performed in order to properly configure the connector.)

If the backend verifies the credentials 212, the platform may retrieve a configuration 216, which may involve getting appropriate configuration information from the backend, which may ultimately be retrieved from the datastore 218. This configuration data that may be retrieved from the datastore 218 may be, for example, stored configuration data provided in an earlier step 206, such as user-specified configuration data stored as a result of the user creating the connector and inputting configuration information on the frontend 202. This retrieved configuration information 218 may then be passed from the datastore, to the backend, and finally to the connector. In an exemplary embodiment, the connector may function to synchronize configurations between the cloud-based backend and the connector, which may be on-premise or may be cloud-based. This may ensure that the latest configurations are consistently applied to the connector.

In an exemplary embodiment, a connector 200 may be configured to scan the local environment to retrieve data or may be configured to retrieve data from a particular API or other program. In an exemplary embodiment, such activity may be configured to occur at a predetermined time or at a predetermined frequency. For example, in an exemplary embodiment, this may be performed as soon as the run-time configuration settings are reached and retrieved, which may be a trigger for the connector to connect to the data source and retrieve data. In another exemplary embodiment, such activity may be configured to be performed once triggered by the user. It also may be contemplated to combine elements of each, if desired; for example, certain data may be automatically fetched and cached when convenient, and may be referenced when a user triggers a scan, while other data may be retrieved as part of the scan, if desired. In an exemplary embodiment, the streaming to the platform may begin as soon as data is collected and may be terminated with the completion of the connector by an end message.

According to an exemplary embodiment, once configuration information is retrieved and it is determined what information should be scanned for, it may be determined whether or not it is an appropriate time to perform a scan. If it is not an appropriate time to perform a scan, the platform may then return to the previous step and await any changes in configuration 216. If it is an appropriate time to perform a scan, the platform may then connect to the destination with which the connector is associated, and may then retrieve data 220. Data may then be shipped. The platform may then determine whether further scans need to be conducted.

In an exemplary embodiment, once data is authorized and shipped from the connector, data may be received at the message buffer. The backend may then retrieve and consume the data in the buffer and store the data 222 as connector data 224 in the datastore. This data may then be used in other platform operations, such as may be desired.

Turning now to exemplary FIG. 3, FIG. 3 provides a comparison 300 between an exemplary platform as provided herein 314 and existing competitor solutions 312, for the purpose of illustrating certain advantages presented by the exemplary platform. As noted herein, the existing tools in the market are not configured to carry out IT audits end-to-end and do not provide an audit opinion of the environment against industry and best practice standards. In terms of what intelligence is offered 302, existing tools 312 may simply provide data for analysis, while the present platform 314 may also opine on any data that it may assemble, and may use it as the basis for generating recommendations. In terms of workflow management 304, existing systems 312 may be limited to facilitating the work flow of audit evidence, while the present platform 314 may also perform an audit evaluation on the audit evidence, using cognitive automation and robotic processing. In terms of acting as a document repository 306, existing systems 312 may facilitate the storage of audit evidence that has been collected, while the present platform 314 may also perform audit evaluations on the stored audit evidence. In terms of acting as an audit tool 308, existing systems 312 may perform limited audit evaluations in highly specific instances, whereas the present platform 314 may perform a fully integrated ("cradle-to-grave") and automated IT audit function across the IT environment. In terms of acting as an IT monitoring tool 310, existing systems 312 may provide specific tools that are specific to individual systems, whereas the present platform 314 may integrate these tools in a useful fashion that allows their inputs to be translated into a form usable by the present platform 314. As such, the present platform 314 may not displace or replace existing investments into tools, and will allow the outputs of these tools to be robustly interrogated against audit evidence, and may further allow comparisons to be collated and aggregated in order to provide a single view of the IT environment through an audit lens.

Figure 4:
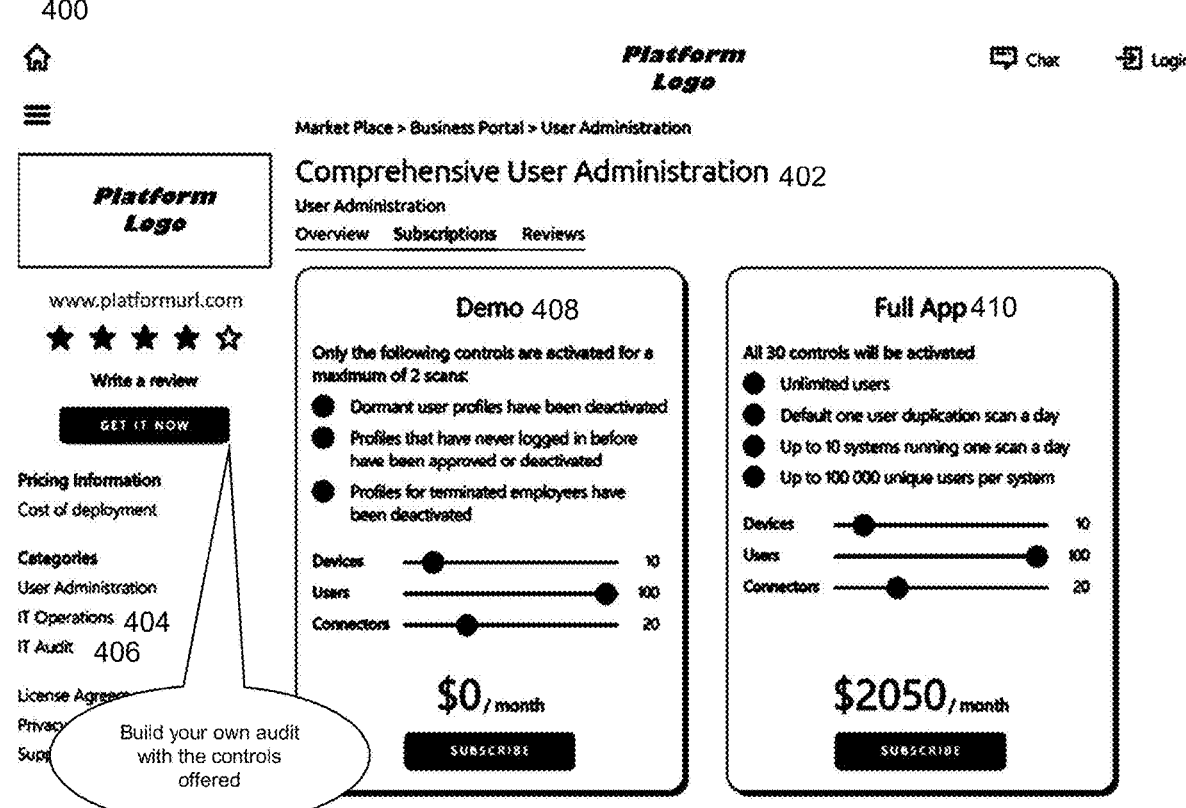
FIG. 4 shows an exemplary embodiment of a user interface of the platform, which specifically depicts a set of IT audit or IT audit services that may be consumed from an online marketplace.

Turning now to exemplary FIG. 4, FIG. 4 depicts an exemplary embodiment of a user interface of the system, which may specifically depict a set of IT audit or IT audit services that may be consumed from an online marketplace. (Various exemplary embodiments of an online marketplace system may be envisioned and may be paired with the auditing platform in different ways. For example, it may be contemplated to have users provided with a "build-your-own audit" system in a first marketplace, and may be contemplated to have predefined "packages" including the most common auditing tools in a second marketplace, including packages for certain types of audit such as financial audits.) In the exemplary embodiment of FIG. 4, the IT audit or IT audit services may be selected from an online marketplace which allows for flexible and tailored purchasing and billing options. Such a system may be modular and scalable, in such a manner that it can be tailored to suit the needs and/or requirements of a company, group of companies and users. The IT audit services provided by the platform may be consumed in modules and are tailored based on the risk profile of the group of companies.

For example, according to an exemplary embodiment, a user may be invited by the interface to "Build your own audit." In such a configuration, the user may be able to select one or more modules that they would like to include as part of their audit, such as a "Comprehensive User Administration" module 402 (which may be associated with a certain number of controls or scans), as well as similar configurations for IT operations 404, and IT auditing 406. In some exemplary embodiments, certain tools may be necessary to the audit as a whole, and may be automatically selected; for example, in an exemplary embodiment, an audit may necessarily include a "Comprehensive User Administration module" 402, which includes the complete suite of all controls and tools that will allow the platform to perform a user administration audit over the users in the IT environment on a continuous basis. Such information may then be used in order to generate recommendations based on the other selected modules 404, 406. For example, a IT operations audit 404 may generate recommendations based on a threat analysis of the IT environment, a cloud readiness module may generate recommendations based on the storage locations of the user's data and the amount of digitization of the user's data; and the mobile device module may generate recommendations based on the compatibility of the user's systems with mobile devices. In some exemplary embodiments, users may also be able to select their own controls or a subset of the controls 408 through a control display in order to generate custom modules, which may, for example, allow a user to audit their dormant user profiles, profiles for terminated employees, and any other controls that might be specified. (For example, in the depicted exemplary embodiment, users may be able to select a full set of controls in a first package 410 or a second, more limited set of controls in a second package 408, with the first package being a more expensive comprehensive package and the second package being a less expensive demo package with lesser functionality. For example, a comprehensive package may be configured to automatically execute some elements of a scan, such as by having up to some number of systems automatically perform a scan every single day, and a limited package may not have these features or may otherwise not include certain controls or be limited in a number of scans that can be made. In addition to these differences, users may also be able to select, for example, a number of connectors that may be provided with the package, a number of licenses of the software or a number of devices on which it will be installed, and a number of users it may be applicable to, such as may be desired. Similar options may be available for other types of controls other than user administration controls as provided in the Comprehensive User Administration module 402, such as may be desired.) Users may also be able to select a customized billing period, such as daily, weekly, monthly, and so forth, which may be specified differently for each module. (In some exemplary embodiments, this may affect the activity of the platform; for example, in an exemplary embodiment, recommendations may be generated by the platform at the conclusion of each billing cycle.)

Figure 5:
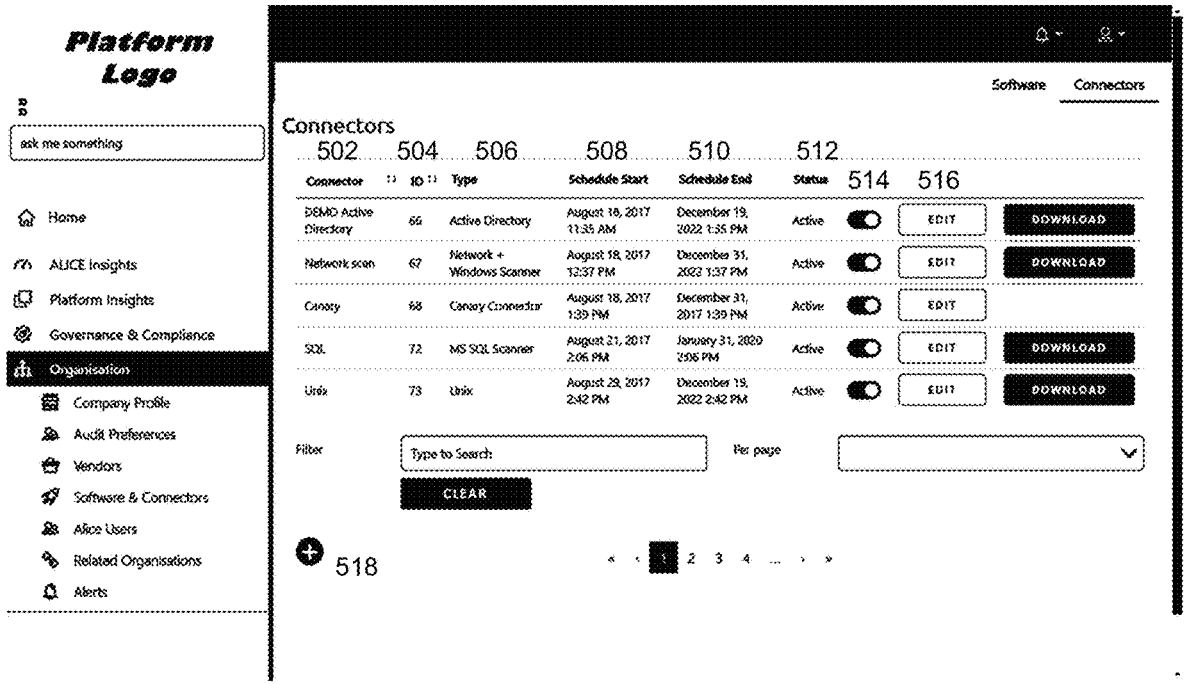
FIG. 5 depicts another exemplary embodiment of a user interface of the platform showing the connectors which can be viewed and managed.

Turning now to exemplary FIG. 5, FIG. 5 depicts another exemplary embodiment of a user interface of the platform 500 showing the connectors which can be viewed and managed. As provided in FIG. 5, the connectors 502 set up on the platform 500 may be listed and viewable on the UI. For example, these connectors include connectors for MICROSOFT ACTIVE DIRECTORY (indicated in this case to be a demo for that tool), a network scan connector, a connector for CANARY, a connector for SQL, and a connector for UNIX. These connectors 502 may provide a framework for integrating, respectively, data provided by MICROSOFT's ACTIVE DIRECTORY software (a directory service for WINDOWS domain networks which provides domain management and other functionality), a user's network scan tool, the output of a user's CANARY tool (an intrusion detection device designed to emulate a realistic network device and monitor access attempts), information stored in a SQL database, and information stored in a UNIX device, such as a UNIX server. Other connectors may be made readily available and may be retrieved as appropriate; for example, it may be noted that several pages of other connectors are also provided in FIG. 5, which may be searchable and may be edited or downloaded as appropriate.

In an exemplary embodiment, any or all of the connectors 502 may be provided with an ID 504, and may be designated as being of a particular type 506, such as a type available through the cloud (such as a connection to a website or a connection to a CANARY device), or a type which may be provided as operational executables which may be stored locally, such as may be desired. This may be designated by an appropriate label, such as ACTIVE DIRECTORY OR UNIX, or otherwise, such as may be desired. Connectors may be provided according to a particular schedule including a schedule start data 508 and a schedule end date 510 for that connector (which may be, for example, a start and end date of a billing cycle for that connector, or otherwise may be a date range in which use of the connector may be enablable, such as may be desired), and may be listed as being active or inactive 512 when enabled or disabled, such as may be desired. Connectors 502 may also be enabled or disabled by a switch or other control mechanism 514, as desired, or may be edited 516 if desired. (In an exemplary embodiment, edits made to a connector 516 may be stored centrally, such that it may be updated once and downloaded more than one time, if desired.) The platform may, for example, be configured to operate in IT environments enabled virtually through deployment of the connectors into the IT environment.

In an exemplary embodiment of the platform, it may be contemplated to have new connectors 502 be added to the existing set, such as through an "add connector" functionality 518. For example, according to an exemplary embodiment, the platform may be connected to new connectors 502 regularly, and the new connectors 502 may be deployed regularly. Exemplary embodiments of connectors 502 may be enabled virtually with limited performance impact on any network or computer processing unit (CPU) of the IT environment. The simultaneous deployments of connectors 502 is also accommodated. A variety of deployment mechanisms may be available for particular connectors 502, including existing supported deployment mechanisms provided through the system provider or self-developed deployment mechanisms performed entirely by the user themselves. The connectors 502 may be configured to only collect data relating to the IT environment based on the connectors 502 the administrator selects, downloads and implements in conjunction with the data being submitted manually by the user.

Figure 6:
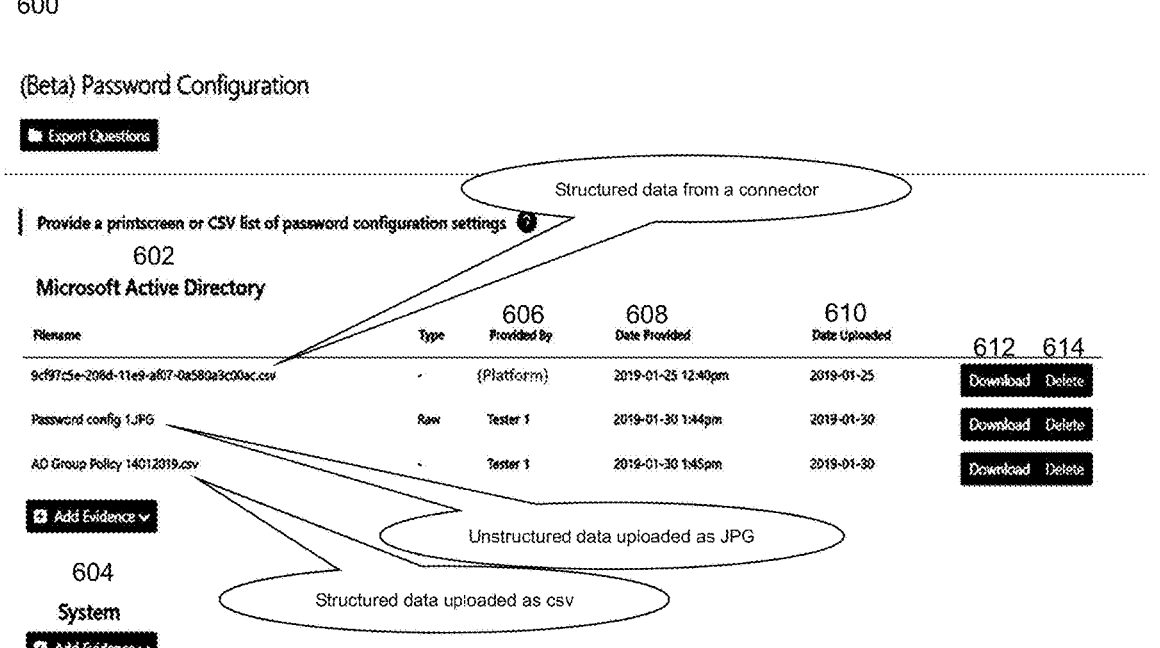
FIG. 6 depicts an exemplary embodiment of a web user interface for manual submission of evidence to be tested and analyzed.

Turning now to exemplary FIG. 6, FIG. 6 depicts an exemplary embodiment of a web user interface 600, for manual submission of evidence to be tested and analyzed. FIG. 6 specifically shows a data collection interface regarding the password configuration settings that may be enabled with respect to particular applications, such as MICROSOFT ACTIVE DIRECTORY 602 or OTHER SYSTEM 604. For each application, a user may be able to upload information relevant to the password configuration settings, in a variety of formats, including, for example, a group or group name for the password configuration settings, a minimum password length, a minimum password age, a maximum password age, and a required or allowed password complexity (such as whether the password requires a minimum number of alphanumeric characters, whether the password requires a minimum number of other characters, whether the password has certain other limitations such as a maximum number of repeated characters or character strings or a minimum number of differences between characters (such that the password cannot be "AAAAAAAAA1" or a similar character string), or any other such restrictions on the password such as may be desired). Other features, like password history tracking, password lockout procedures such as a maximum number of login attempts, an idle session expiry timer or expiry criteria, or other such applicable settings may also be uploaded, such as may be desired. In various exemplary embodiments, this information may be provided in any applicable form, such as in the form of a JPG or other image file, or in the form of structured data such as a comma-separated values (CSV) file. (In the exemplary embodiment specifically shown in FIG. 6, it may be contemplated that a CSV file may be used to provide many of the relevant data values. In an exemplary CSV file, the user can leave blank any settings that are not enabled or which are not known, or can indicate them with a specific placeholder data value, such as a zero. Other such configurations may also be contemplated, such as using a zero to indicate "not present," a one to indicate "present," and leaving the section blank to indicate "unknown." In an exemplary embodiment, the platform may then attempt to fit data into these blank placeholders based on, for example, scanned password policy documents such as the password configuration screen shown as a JPG in the example case.)

As shown, the platform may allow for multiple submission types of evidence such as connector information, manual file uploads and unstructured data sources, amongst others. Evidence may be added on the UI once added, along with other identifying information, such as an identity of the company agent that provided the information 606, a date on which it was provided 608, and a date that it was uploaded to the system 610. Information may also be downloaded 612 or deleted 614, such as may be desired.

Figure 7B:
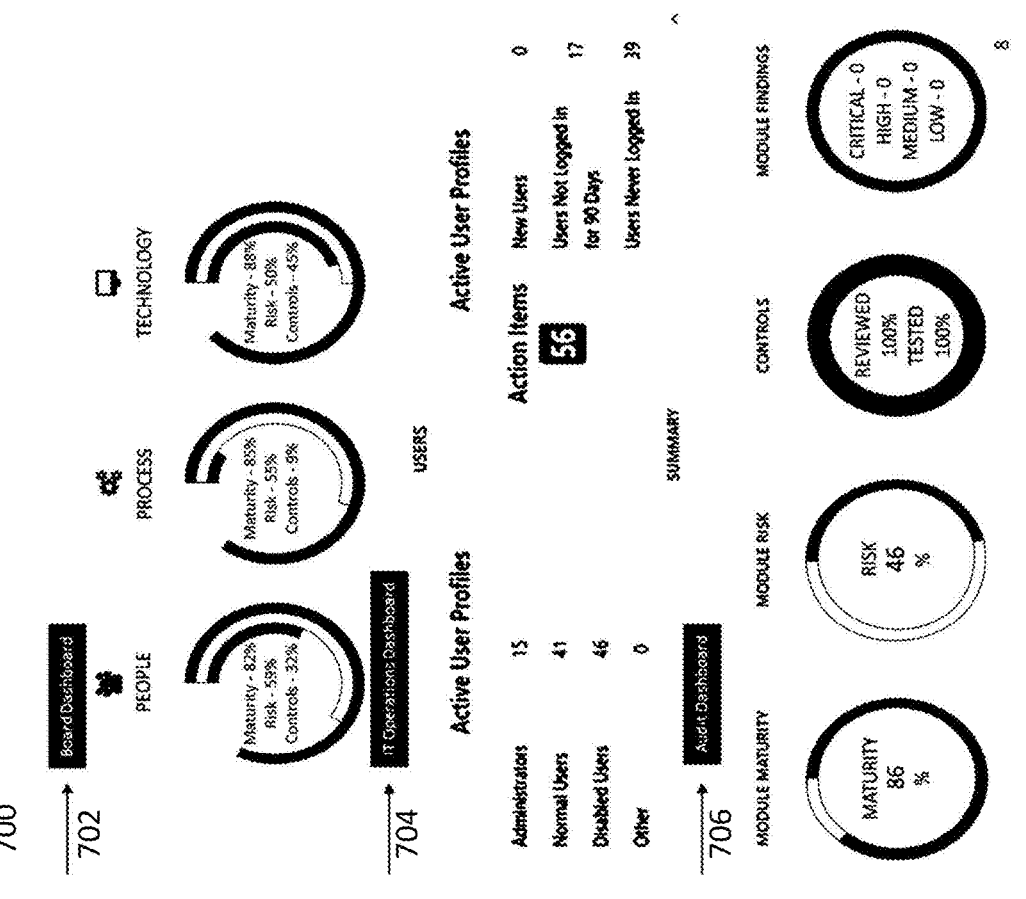
FIG. 7B depicts another exemplary embodiment of a user interface of the platform showing the dashboards for reporting, which may be linked to the user interface shown in FIG. 7A in a combined user interface.

Turning now to exemplary FIGS. 7A and 7B, FIGS. 7A and 7B together depict another exemplary embodiment of a user interface of the system showing the dashboards for reporting 700. According to an exemplary embodiment, dashboards including a board dashboard 702, an IT operations dashboard 704, and an audit dashboard 706 may be provided.

As shown in exemplary FIGS. 7A and 7B, the platform may allow for reporting of results from the testing and analysis of data collected. The aggregation and/or consolation of complex and disparate data structures may be managed using the platform. Dashboards, such as dashboards 702, 704, 706, may be provided with dashboard-type reporting with drill-down capabilities. The reporting features of the platform may equip different audiences with the relevant level of visibility into the risk, governance and security of the IT landscapes. These audiences may range from the board of a company or group of companies (or other management personnel), who may be provided with a board dashboard 702 showing an overall executive summary; the IT operations of the same group or groups, who may be provided with detailed statistics relevant to the IT operations of the company or companies via an IT Operations Dashboard 704; or the audit and risk committees, who may be shown auditing information on an Audit Dashboard 706 (including, for example, any non-technical audit information such as financial audit information, such as may be desired); amongst others. Other customized reports may also be created; for example, according to an exemplary embodiment, it may be contemplated to have reports created based on free-text options which may be specified by the user. The ability of the platform to maintain multiple customized dashboards and report features to the user may thereby provide a reporting feature of the platform that allows for user centricity, meaning that the platform provides a single view of the user, company or group, across the IT environment with associated risks and maturities.

To give examples of the data that may be shown in each dashboard 702, 704, 706 or which may be shown in sections corresponding to Board, IT Operations, or Audit areas, as shown in exemplary FIG. 7B, it may be contemplated that a high-level overview shown in the board dashboard 702 may provide a summary of control risks related to people (including a level of control maturity, a level of risk associated with a current control level, and a number of controls to which the company is currently subscribed, herein abbreviated as "maturity," "risk," and "controls," respectively), and similar displays for control risks related to processes and technology. Other categories may also be contemplated. It may also be contemplated to provide other data via this interface, such as, for example, comparable levels for other companies or other industry participants (if such data is known), historical levels which may be provided for purposes of comparison, forecasted future levels (including forecasted future levels if no action is taken or forecasted future levels if a certain control or set of controls is subscribed to), or any other such relevant information such as may be desired. It may further be contemplated that, in an IT Operations dashboard 704, information related to the day-to-day administration of IT operations may be provided, such as a number of administrators, a number of normal users and a number of users who have been disabled (such as employees on extended leave or who have left the company, or users who it has otherwise been determined should not have access), as well as information on the user profiles such as a number of user profiles of new users or users requiring follow-up such as users not active for a certain period of time or users who have been completely inactive. Finally, it may be contemplated that, in an audit dashboard 706, information related to the progress of the audit may be provided, such as a number of controls that have been reviewed and a number of controls that have been tested. The results of the tests may likewise be shown.

Figure 8:
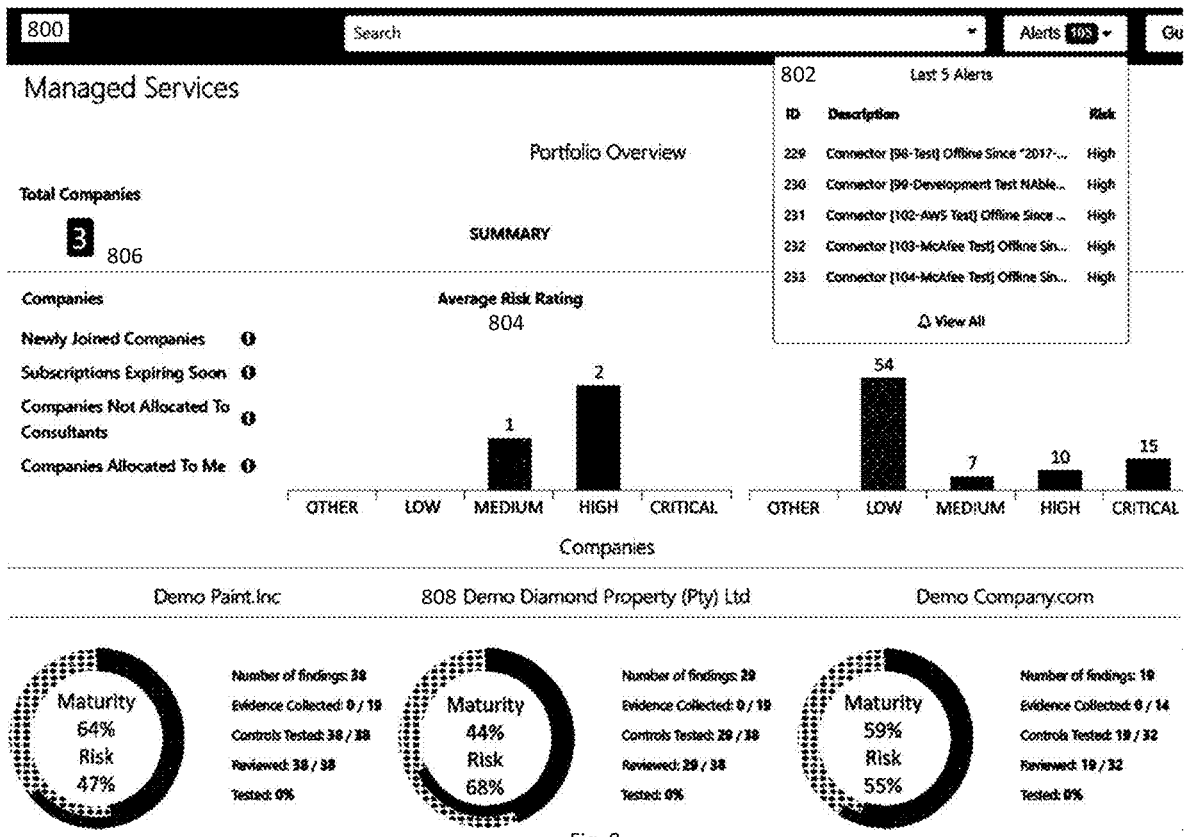
FIG. 8 depicts another exemplary embodiment of a user interface of the platform showing remediation recommendations, risk ratings, and alerts for companies which form part of a group of companies.

Turning now to exemplary FIG. 8, FIG. 8 depicts another exemplary embodiment of a user interface 800 of the platform, in this case showing remediation recommendations, risk ratings 804, and alerts 802 for companies which form part of a group of companies 806. Detailed summaries of some or all of the companies in the group 806 may also be shown 808.

In an exemplary embodiment, the platform may facilitate remediation by providing filtered alert mechanisms, global anomaly trending, predictions, detection and recommended responses. The remediation recommendations may be customized to suit the user's needs, based on criteria including measurable metrics, the best product fit for the user, and benchmarking available to compare solutions to one another. The platform may be configured to alert or notify the user of current risk exposures or inefficiencies within the IT environment. The platform may be configured to map the existing specifications of the user's IT environment to a proposed specification based on product catalogues and/or rules and architecture intelligence.

According to an exemplary embodiment, the exemplary interface 800 may specifically show a portfolio overview for all received alerts 802 that might be applicable to a set of selected companies in the group 806. For example, the platform may show the set of received alerts 802 that have the highest risk or highest priority in a preview screen, with the other remaining alerts also being viewable upon selection of the "alerts" tab or a link in the "alerts" tab like a "view all" command. The received alerts may be summarized via their risk ratings 804, for example based on the average risk rating of the received alerts, or a summary of the risk ratings of all alerts. The companies in the group 806 may also be summarized, based on, for example, whether the companies have newly joined, whether the companies have subscriptions expiring soon, whether the companies have been allocated to auditors/consultants or not, or whether the company has been allocated to a particular consultant. In this case, three companies 808 are shown, each one being scored based on the company's maturity, indicating a state of development of the company's IT infrastructure and policies, and based on the company's risk, indicating a level of risk to the company's infrastructure. Each one may be scored based on, for example, a number of findings (which may each provide an alert), a number of items of physical evidence or other evidence that have been collected so far (such as, for example, information about a password policy), a number of controls that have been tested by the software so far, a number of control tests that have been received and reviewed by the consultant or auditor, and a scope of testing that has been provided by the present platform (currently at 0% for each company).

Figure 9:
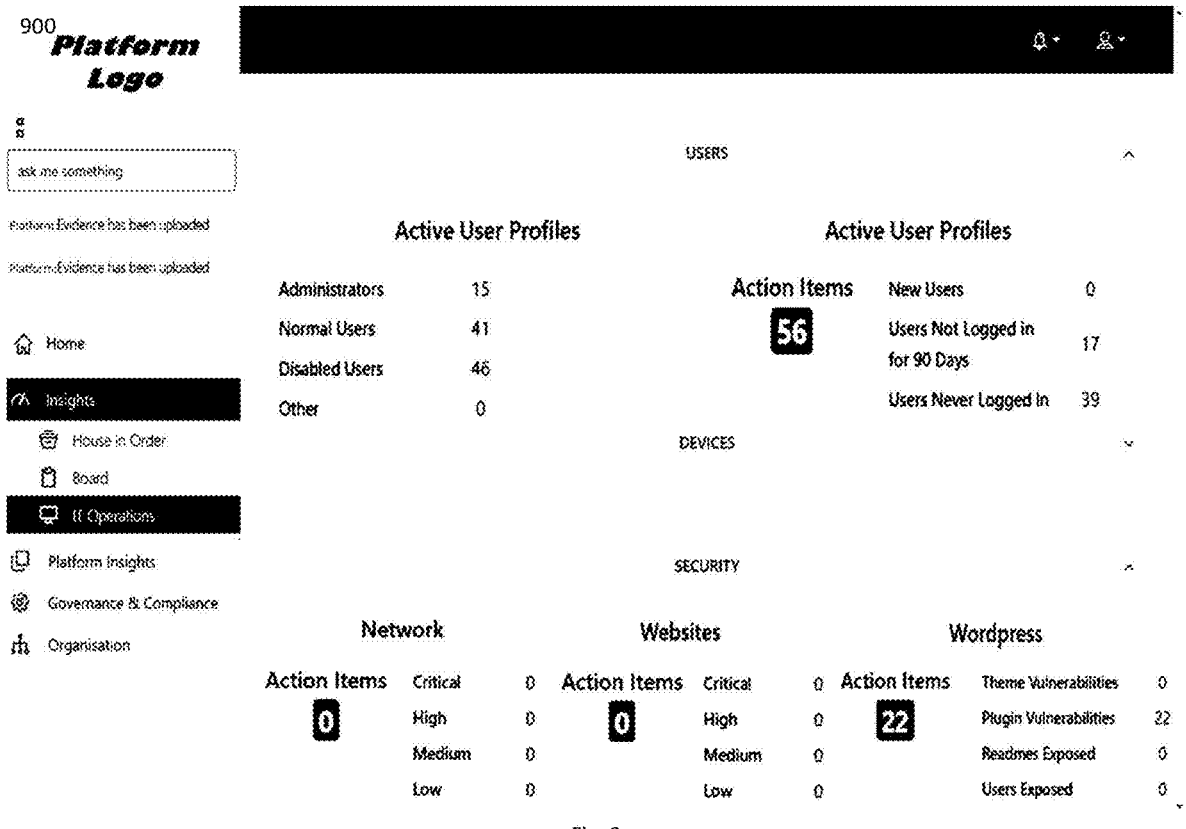
FIG. 9 depicts another exemplary embodiment of a user interface of the platform showing platform insights relating to assets and security.

Turning now to exemplary FIG. 9, FIG. 9 depicts another exemplary embodiment of a user interface of the system showing platform insights relating to users and security 900. Looking specifically at FIG. 9, the platform may be configured to provide a more detailed breakdown of data related to the IT Operations dashboard, such as a breakdown of security issues by sources. According to an exemplary embodiment, an IT Operations dashboard may highlight a select set of most urgent action items for display on that dashboard, which in that case all had to do with the active user profiles and specifically related to the users who had not logged in for a given time period or who had never logged in. However, in the detail page for IT operations 900, further information may be shown, such as a list of all action items related to the network, a list of all action items related to the one or more websites that the company is operating, and a list of all action items related to the programs that the company is using, like WORDPRESS, to administer the network or one or more websites, or which otherwise may present vulnerabilities. In an exemplary embodiment, each program that is analyzed by the platform may include program-specific action items such as theme vulnerabilities, plugin vulnerabilities, exposed files such as exposed readmes, or exposed users.

Figure 10:
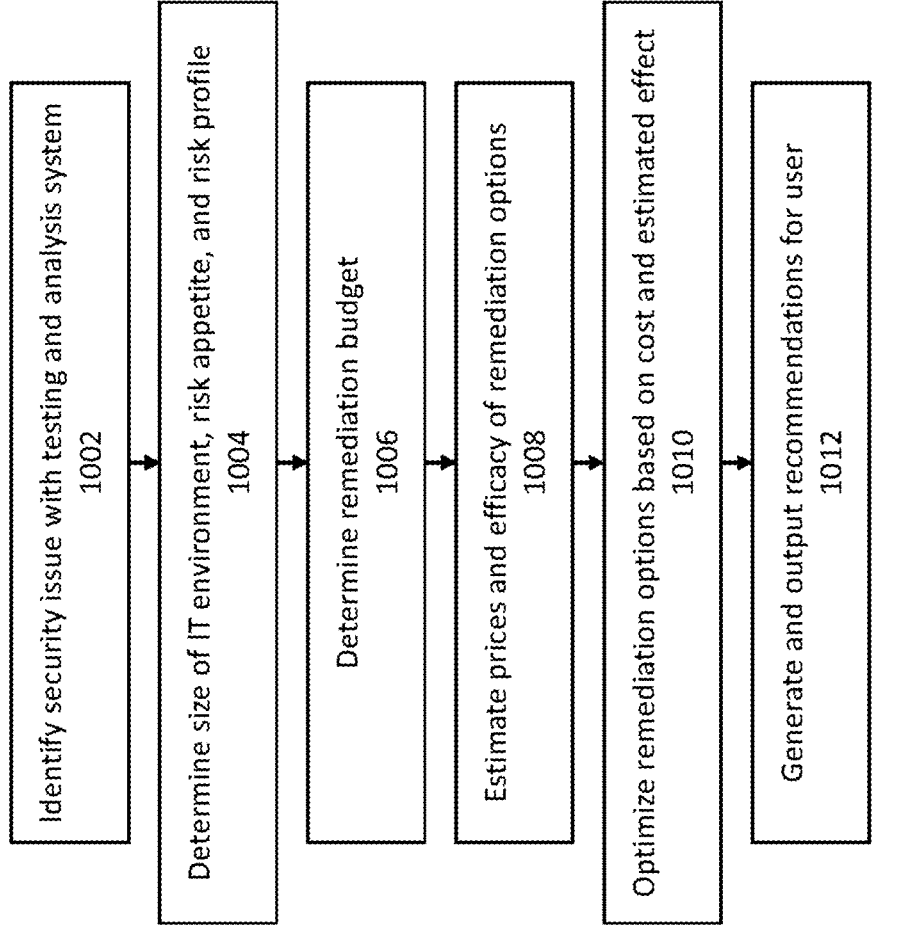
FIG. 10 depicts an exemplary process flow diagram for a recommendation generation function.

Turning now to exemplary FIG. 10, FIG. 10 depicts an exemplary process flow diagram for a recommendation generation function 1000. In a first step, the platform may identify a security issue, using a testing and analysis platform 1002. In a next step, the platform may identify the size of the organization's IT environment, the risk appetite of the organization, and the risk profile of the IT environment 1004, including information regarding the estimated frequency of attacks, the estimated targets of attacks, the estimated severity of attacks and so forth. Such information may be based on, for example, industry benchmarking, the history of the business, or other sources such as may be desired. Risk appetite information may be used to weigh risk profile information; for example, if the organization assigns a low impact to attacks on availability, remedial measures in this regard may be deprioritized even if attacks on availability are likely. In a next step, the platform may determine the organization's remediation budget 1006. In a next step, the platform may determine the estimated prices and efficacy of various remediation options 1008, which may be based on, for example, industry benchmarking. The platform may then optimize the remediation options based on the estimated cost of each option (such as a price of each tool and an estimated cost of implementation) and an estimated effect that each option would have on the overall risk 1010. The platform may then generate and output recommendations for a user 1012.

Figure 11:
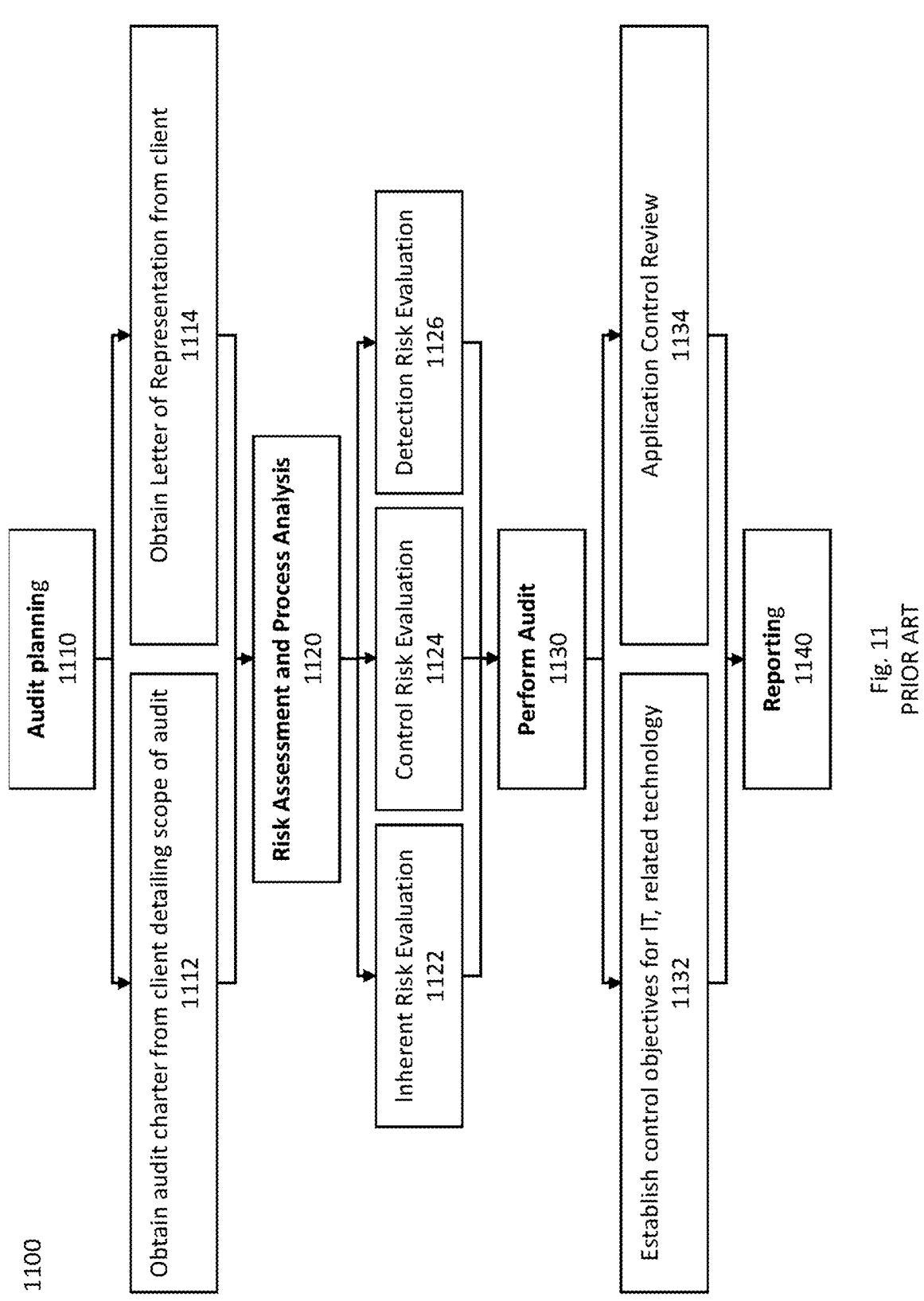
FIG. 11 depicts an exemplary process flow diagram for a typical audit process that may be performed without the use of the present platform, such as might be understood in the prior art.

Turning now to exemplary FIG. 11, FIG. 11 depicts an exemplary process flow diagram for a typical audit process 1100 that may be performed without the use of the present platform, such as might be understood in the prior art, and which is provided to better contextualize the improvements made by the present platform.

In a typical audit process 1100, a first phase may begin with a planning step 1110 in which it is determined exactly what the audit objectives are going to be. Two major documents are generally requested. First, an audit charter is provided by the client 1112, detailing the purpose of the audit, and the management responsibility, authority and accountability of the audit. For example, the mission, aims, goals, and objectives of the audit may be specified, based on exactly what is demanded by the client and what laws and professional standards are in effect. In addition to the audit charter, a Letter of Representation 1114 is also usually sought and obtained, usually for the purpose of ensuring that the audit is full and comprehensive, and that all information disclosed is accurate.

A second phase may be a risk assessment and process analysis step 1120, evaluating a level of risk that they currently face as a result of their IT environment. While not all audits use a risk-based audit approach, risk-based audits typically are easily adapted toward an iterative improvement process, whereby a current level of risk may be evaluated, improvements may be made, and an effect on risk may be evaluated. The risk assessment process in this step 1120 may also inform aspects of the audit, such as an area or business function to be specifically targeted; the nature, extent and timing of audit procedures; and the amount of resources to be allocated to an audit. (Audits of a system that is not expected to be critical, for example, may be performed in such a manner as to minimize their impact.)

The second phase 1120 may include evaluation of inherent risk 1122, control risk 1124, and detection risk 1126. Inherent risk 1122 is the susceptibility of an audit area to potentially significant error, individually or in combination with other errors, assuming that there were no related internal controls for minimizing or eliminating the error. (One example is "pressures on information systems management which may predispose them to conceal or misstate information.") Control risk 1124 is the risk that an error could occur in an audit area and would not be prevented or detected and corrected on a timely basis by the internal control system. (For example, the risk associated with a common automated procedure malfunctioning may be low, while the risk associated with a control that requires manual analysis of logging software may be high, owing to a high possibility of error being associated with that methodology.) Control risk 1124 may be low for systems that can readily be identified, evaluated as effective, and tested and proved to be operating appropriately. Detection risk 1126 is the risk that the auditor's procedures will not detect a potentially significant error, based on the auditor's assessment of inherent and control risk.

The third phase 1130 may include actually performing the audit, involving steps of providing supervision, gathering audit evidence, and documenting audit work. A first step in this process is often generating control objectives for information and related technology (COBIT) 1132, a set of best practices for IT management. Review may typically involve examination and evaluation of planning and organization of information resources; planning and acquisition of systems (and growth in current systems); operation and support of IS/IT facilities, operations, utilization and access; monitoring of the processes surrounding the information systems; the level of effectiveness, efficiency, confidentiality, integrity, availability, compliance and reliability associated with the information held in the IS/IT systems; and the level of utilization of IT resources available within the environment of the IS including people, the application systems of interface, technology, facilities and data. The process may also include application control review 1134, which will generally evaluate controls effectiveness and efficiency, application security, and whether the application performs as expected for each control.

All of this information may then be documented and reported 1140, often along with recommendations for improvement. (This may then be the basis for iterative improvement of the overall system.) A typical report generally includes identification of an organization, intended recipients and any restrictions on circulation; detailed information on the scope, objectives, period of coverage, nature, timing and the extend of the audit work; a set of findings, conclusions, recommendations and any reservations, qualifications and limitations on those findings; and audit evidence, based on what was collected.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for protecting a computer network by identifying actionable security issues on the computer network using an automated platform connected to the computer network, the method comprising:

creating and storing, via a user interface, as part of a collecting system, at least one connector in a plurality of connectors, wherein each of the plurality of connectors comprises a data file storing instructions for integration of data from at least one other software tool or platform into the automated platform and is configured to automatically convert a first data structure or first data format into a second data structure or second data format, wherein each connector in the plurality of connectors has a connector type indicating a specific data type converted by said connector;

wherein creating and storing the at least one connector further comprises defining, via the user interface, a configuration for the at least one connector based on the connector type of the connector, and storing the configuration for the connector as a stored connector configuration in the automated platform;

wherein creating and storing the at least one connector further comprises storing, in the data file of the at least one connector, at least one unique set of credentials associated with the at least one other software tool or platform accessed by the at least one connector, and validating, with the automated platform, the at least one unique set of credentials by sending them to the at least one other software tool or platform and receiving a response;

following a validation of the credentials, retrieving, from the automated platform, the stored connector configuration, and synchronizing a connector configuration between the at least one connector and the stored connector configuration, wherein synchronizing the connector configuration comprises determining whether a connector version implemented in the at least one connector and a connector version of the stored connector configuration are different, and, when the connector version implemented in the at least one connector and the connector version of the stored connector configuration are different, updating at least one of the connector version implemented in the at least one connector and the connector version of the stored connector configuration to a most current configuration;

collecting, using a collecting system, a set of client data comprising both structured and unstructured data, the set of client data including data corresponding to a plurality of client systems, wherein the set of client data is collected from multiple data sources and via the plurality of connectors forming part of the collecting system, wherein structured data is of the specific data type for one or more of the plurality of connectors and unstructured data is not of the specific data type for one or more of the plurality of connectors;

providing a data output to an application programming interface (API) and services platform based on the set of client data;

collecting and separating, from the set of client data, the structured data, wherein collecting and separating the structured data comprises matching the structured data to connectors from the plurality of connectors based on one or more identifiers in the structured data and identifying, in the set of client data, at least one unfamiliar data structure;

receiving at least one edit to one of the plurality of connectors, synchronizing the edit with centrally-stored connectors provided on a central repository, and enabling download of the centrally-stored connectors including an edited connector following the edit;

executing, on the API and services platform, at least one data interpretation step, the at least one data interpretation step comprising passing the data output to at least one skills API, performing, with the at least one skills API, digital interpretation of unstructured data provided in the data output, and aggregating the structured data and interpreted unstructured data comprising at least the unfamiliar data structure into aggregated data;

executing, on a processing platform coupled to the API and services platform, at least one evaluation step on the aggregated data, the at least one evaluation step comprising:

determining a digital service to be executed comprising at least an evaluation of user account information security, executing the digital service on the data corresponding to each of the plurality of client systems, comprising retrieving a plurality of user accounts from a user account information storage system, and performing testing and analysis on each of the plurality of client systems with the processing platform comprising evaluation of a plurality of digital service guidelines and digital service requirements for each of the plurality of client systems, comprising at least:

for each user account in the plurality of user accounts, identifying user account information comprising at least a user name and human resource status information associated with the user name and comprising at least one of an engagement date and a termination date, determining, for a system as a whole, policy information comprising at least one of: a policy for a speed of creation and approval of new accounts, and a policy for a speed of elimination of old accounts, and executing a comparison comprising at least one of: determining a difference between a current time and an engagement date and comparing said difference to the policy for the speed of creation and approval of new accounts, and determining a second difference between the current time and a termination date and comparing said second difference to the policy for the speed of elimination of old accounts, and generating and obtaining, on the processing platform, for each of the plurality of client systems, a digital service result comprising at least a risk level determined based on the comparison, and further storing the digital service results on the processing platform, wherein a plurality of dashboards are generated and updated based on the digital service results stored on the processing platform, a first dashboard being a summary dashboard comprising a plurality of graphical displays simultaneously displaying each of the digital service results for each of the plurality of client systems, and a second dashboard being a monitoring dashboard comprising at least one currently actionable item identified by the processing platform;

generating and outputting at least one recommendation to a user of the automated platform for remediation of the at least one currently actionable item, wherein the at least one recommendation includes a remediation solution;

implementing the remediation solution; and pushing the at least one recommendation to a central repository of organizations including a plurality of groups of organizations, a first group including an organization associated with the client data and a plurality of other organizations, and a second group not including the organization associated with the client data, and automatically providing an alert to the plurality of organizations in the first group and not to the second group based on at least one modification to data applicable to the first group.

2. The method of claim 1, wherein the method further comprises the step of performing a machine learning process to translate at least some of the unstructured data into structured data, wherein the machine learning process comprises analysing, by the API and services platform, the unstructured data and translating the unfamiliar data structure into a familiar data structure.

3. The method of claim 1, wherein the step of executing, on a processing platform coupled to the API and services platform, at least one evaluation step comprises measuring, by the processing platform, the aggregated data against predefined requirements to determine the absence or presence of an assessment finding based on predefined logic, rules and machine learning algorithms.

4. The method of claim 1, wherein each of the steps of collecting, using the collecting system, the set of client data, and providing the data output to the API and services platform based on the set of client data, are performed contemporaneously, whereby a first set of data is output to the API and services platform prior to an end to a step of collecting the set of client data.

5. The method of claim 1, wherein collecting the set of client data further comprises receiving, through a web user interface (UI) of the collecting system, manually-input data.

6. The method of claim 1, wherein the method further comprises determining, by the processing platform, an estimated efficacy of the remediation solution prior to outputting the remediation solution to the user.

7. The method according to claim 6, wherein the remediation solution is determined by the processing platform based on constraints provided by the user, wherein the constraints comprise a minimum rating, and wherein the remediation solution is associated with a rating score comprising at least one rating of one or more other users.

8. The method of claim 1, wherein the step of executing, on a processing platform coupled to the API and services platform, at least one evaluation step comprises transmitting data from the API and service platform to the processing platform via a hypertext transfer protocol secure (HTTPS) representational state transfer (REST) API.

9. The method of claim 1, wherein the step of providing the data output to the API and services platform based on the set of client data is performed contemporaneously with the step of synchronizing the connector configuration between the connector and the stored configuration, wherein the step of providing the data output to the API and services platform based on the set of client data is initiated during a synchronization process after the synchronization process has synchronized run-time settings.

10. The method of claim 1, wherein the method further comprises:

via the user interface, selecting the connector type for at least one of the connectors, and performing, via the user interface, an edit to the connector type; and storing the edit to the connector type as the stored connector configuration in the automated platform prior to the step of creating, via the user interface, the connector having the connector type.

11. The method of claim 1, wherein generating and updating the first dashboard further comprises retrieving at least one past data record for a company associated with the digital assessment and generating the plurality of graphical displays based on the at least one past data record.

12. The method of claim 11, wherein generating and updating the first dashboard further comprises retrieving at least one forecast and generating the plurality of graphical displays based on the at last one past data record and the at least one forecast.

13. The method of claim 1, wherein the step of providing a data output to an API and services platform based on the set of client data further comprises:

incorporating the data output into a message buffer; and with the API and services platform, consuming the message buffer prior to storage of the data output.

14. The method of claim 1, wherein the method further comprises:

receiving, via a user interface, a submission of at least one data file;

determining, based on one or more of the connectors, a matching connector in the one or more connectors; and automatically assigning the matching connector to the at least one data file, and uploading the at least one data file via the matching connector.

15. The method of claim 1, wherein the method further comprises simultaneously executing a plurality of digital services, each of the plurality of digital services being operated in multi-tenanted form on the automated platform.

16. The method of claim 1, wherein the method further comprises:

determining, via a multi-factor authentication step, a right of access of the user and a level of access of the user; and limiting the set of client data based on the level of access of the user.

17. The method of claim 1, wherein the set of client data further comprises an organizational hierarchy, and wherein the method further comprises:

identifying, in the set of client data, a user profile;

transmitting, to an administrator of the organizational hierarchy, a unique code associated with the user profile; and linking the user profile to the organizational hierarchy.

18. The method of claim 1, wherein the plurality of connectors includes:

at least one local connector comprising a data file comprising at least one set of credentials and comprising program code for automatically collecting data from systems on a local IT environment; and at least one cloud connector comprising a data file comprising at least one other set of credentials and comprising instructions for automatically communicating with a cloud system via a web user interface.

19. The method of claim 1, wherein the method further comprises, as an initial step:

upon accessing the automated platform, setting up the plurality of connectors, comprising receiving, from a user interface, a plurality of unique sets of credentials, wherein each unique set of credentials in the plurality of unique sets of credentials is encrypted and stored in association with a respective connector in the plurality of connectors in a user environment, and wherein said respective connector is configured to use said encrypted unique set of credentials in connector interface traffic.

20. A system for protecting a computer network by identifying actionable security issues on the computer network using an automated platform connected to the computer network, the system comprising:

a collecting system linked to a user interface, wherein the collecting system is configured to receive, via the user interface, at least one connector in a plurality of connectors, wherein each of the plurality of connectors comprises a data file storing instructions for integration of data from at least one other software tool or platform into the automated platform and is configured to automatically convert a first data structure or first data format into a second data structure or second data format, wherein each connector in the plurality of connectors has a connector type indicating a specific data type converted by said connector;

wherein the collecting system is configured to receive the at least one connector based on defining, via the user interface, a configuration for the at least one connector based on the connector type of the connector, and storing the configuration for the connector as a stored connector configuration in the automated platform;

wherein creating and storing the at least one connector further comprises storing, in the data file of the at least one connector, at least one unique set of credentials associated with the at least one other software tool or platform accessed by the at least one connector, and wherein the automated platform is configured to subsequently validate the at least one unique set of credentials by sending them to the at least one other software tool or platform and receiving a response;

wherein the system is further configured to, following a validation of the credentials, retrieve, from the automated platform, the stored connector configuration, and synchronize a connector configuration between the at least one connector and the stored connector configuration, wherein synchronizing the connector configuration comprises determining whether a connector version implemented in the at least one connector and a connector version of the stored connector configuration are different, and, when the connector version implemented in the at least one connector and the connector version of the stored connector configuration are different, updating at least one of the connector version implemented in the at least one connector and the connector version of the stored connector configuration to a most current configuration;

wherein the collecting system is further configured to collect a set of client data collected from multiple data sources comprising both structured and unstructured data, the set of client data including data corresponding to a plurality of client systems, wherein the set of client data is collected from multiple data sources and via the plurality of connectors, wherein structured data is of the specific data type for one or more of the plurality of connectors and unstructured data is not of the specific data type for one or more of the plurality of connectors;

an application programming interface (API) and services platform having a data connection to the collecting system, wherein the collecting system is configured to provide a data output to the data connection based on the set of client data;

wherein the automated platform is configured to collect and separate, from the set of client data, the structured data, wherein collecting and separating the structured data comprises matching the structured data to connectors from the plurality of connectors based on one or more identifiers in the structured data and identifying, in the set of client data, at least one unfamiliar data structure;

wherein the automated platform is configured to receive at least one edit to one of the plurality of connectors, synchronize the edit with centrally-stored connectors provided on a central repository, and enable download of the centrally-stored connectors including an edited connector following the edit;

at least one skills API, wherein the API and services platform is configured to execute at least one data interpretation step, the at least one data interpretation step comprising passing the data output to the at least one skills API, wherein the at least one skills API is configured to perform, with the at least one skills API, digital interpretation of unstructured data provided in the data output, and is configured to aggregate the structured data and interpreted unstructured data comprising at least the unfamiliar data structure into aggregated data;

a processing platform coupled to the API and services platform configured to execute at least one evaluation step on the aggregated data, the at least one evaluation step comprising:

determining a digital service to be executed comprising at least an evaluation of user account information security, executing the digital service on the data corresponding to each of the plurality of client systems, comprising retrieving a plurality of user accounts from a user account information storage system, and performing testing and analysis on each of the plurality of client systems with the processing platform comprising evaluation of a plurality of digital service guidelines and digital service requirements for each of the plurality of client systems, comprising at least:

for each user account in the plurality of user accounts, identifying user account information comprising at least a user name and human resource status information associated with the user name and comprising at least one of an engagement date and a termination date, determining, for a system as a whole, policy information comprising at least one of: a policy for a speed of creation and approval of new accounts, and a policy for a speed of elimination of old accounts, and executing a comparison comprising at least one of:

determining a difference between a current time and an engagement date and comparing said difference to the policy for the speed of creation and approval of new accounts, and determining a second difference between the current time and a termination date and comparing said second difference to the policy for the speed of elimination of old accounts, and generating and obtaining, on the processing platform, for each of the plurality of client systems, a digital service result comprising at least a risk level determined based on the comparison, and further storing the digital service results on the processing platform, wherein a plurality of dashboards are generated and updated based on the digital service results stored on the processing platform, a first dashboard being a summary dashboard comprising a plurality of graphical displays simultaneously displaying each of the digital service results for each of the plurality of client systems, and a second dashboard being a monitoring dashboard comprising at least one currently actionable item identified by the processing platform;

wherein the automated platform is further configured to generate and output at least one recommendation to a user of the automated platform for remediation of the at least one currently actionable item, wherein the at least one recommendation includes a remediation solution; and wherein the automated platform is further configured to implement the remediation solution; and wherein the automated platform is further configured to push the at least one recommendation to a central repository of organizations including a plurality of groups of organizations, a first group including an organization associated with the client data and a plurality of other organizations, and a second group not including the organization associated with the client data, and automatically providing an alert to the plurality of organizations in the first group and not to the second group based on at least one modification to data applicable to the first group.

* * * * *